US012696117B2

(12) United States Patent
Zhang et al.

(10) Patent No.: US 12,696,117 B2
(45) Date of Patent: Jul. 28, 2026

(54) QUALITY OF EXPERIENCE MEASUREMENTS FOR RADIO ACCESS NETWORKS

(71) Applicant: ZTE Corporation, Shenzhen (CN)

(72) Inventors: Man Zhang, Shenzhen (CN); Zhuang Liu, Shenzhen (CN); Dapeng Li, Shenzhen (CN); Yin Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 696 days.

(21) Appl. No.: 18/172,894

(22) Filed: Feb. 22, 2023

(65) Prior Publication Data

US 2023/0199543 A1      Jun. 22, 2023

Related U.S. Application Data

(63) Continuation of application No. PCT/CN2021/087103, filed on Apr. 14, 2021.

(51) Int. Cl.
*H04W 24/10*        (2009.01)
*H04W 72/231*      (2023.01)

(52) U.S. Cl.
CPC ......... *H04W 24/10* (2013.01); *H04W 72/231* (2023.01)

(58) Field of Classification Search
None
See application file for complete search history.

(56) References Cited

U.S. PATENT DOCUMENTS

| | | | |
|---|---|---|---|
| 2017/0359252 A1* | 12/2017 | Kumar | H04L 12/4633 |
| 2019/0028384 A1* | 1/2019 | Penno | H04L 45/306 |
| 2019/0140863 A1* | 5/2019 | Nainar | H04L 45/34 |
| 2020/0145255 A1* | 5/2020 | Pignataro | H04L 12/4633 |
| 2020/0413301 A1 | 12/2020 | Shi et al. | |
| 2022/0103658 A1* | 3/2022 | Pack | H04L 47/2483 |

(Continued)

FOREIGN PATENT DOCUMENTS

| | | |
|---|---|---|
| CN | 110402588 A | 11/2019 |
| CN | 111567080 A | 8/2020 |

(Continued)

OTHER PUBLICATIONS

Extended European Search Report for European Application No. 21936370.2, Mail Date: Apr. 5, 2024.

(Continued)

*Primary Examiner* — Christopher T Wyllie
(74) *Attorney, Agent, or Firm* — Perkins Coie LLP

(57)        ABSTRACT
Methods, systems, and devices for configuring quality-of-experience (QoE) measurements in mobile cellular networks are described. An example method for wireless communication includes generating, by a network node based on a first QoE measurement configuration, a second QoE measurement configuration, and transmitting, to a wireless device, a first radio resource control message comprising the second QoE measurement configuration and an activation configuration, wherein the first QoE measurement configuration configures the wireless device to perform QoE measurements that are not visible to the network node and the second QoE measurement configuration configures the wireless device to perform QoE measurement that are visible to the network node.

12 Claims, 18 Drawing Sheets

1400

Generating, by a network node based on a first quality of experience (QoE) measurement configuration, a second QoE measurement configuration, the first QoE measurement configuration configuring the wireless device to perform QoE measurements that are not visible to the network node and the second QoE measurement configuration configuring the wireless device to perform QoE measurement that are visible to the network node

1410

Transmitting, to a wireless device, a first radio resource control message comprising the second QoE measurement configuration and an activation configuration

1420

(56)                References Cited

U.S. PATENT DOCUMENTS

| | | | | |
|---|---|---|---|---|
| 2022/0150160 A1* | 5/2022 | Kumar | | H04L 67/63 |
| 2022/0247688 A1* | 8/2022 | Puente Pestaña | | H04L 45/64 |
| 2023/0134119 A1* | 5/2023 | Liu | | H04W 24/08 |
| | | | | 370/331 |
| 2023/0319616 A1* | 10/2023 | Lunardi | | H04W 28/0284 |
| | | | | 370/329 |
| 2024/0031253 A1* | 1/2024 | Liu | | H04L 41/5067 |
| 2024/0098532 A1* | 3/2024 | Rune | | H04W 24/08 |
| 2024/0137294 A1* | 4/2024 | Choi | | H04L 41/5067 |

FOREIGN PATENT DOCUMENTS

| | | |
|---|---|---|
| EP | 4305868 A1 | 1/2024 |
| WO | 2020/128657 | 6/2020 |
| WO | 2020/164082 | 8/2020 |
| WO | 2022217477 A1 | 10/2022 |

OTHER PUBLICATIONS

3rd Generation Partnership Project; Technical Specification Group Radio Access Network; Study on NR QoE Management and Optimizations for Diverse Services (Release 17), 3GPP TR 38.890 V0.3.0 Feb. 2021, R2-2102633.Zip R3-211233, sections 6.7, pp. 12-14.

Huawei Moderator, Summary of Offline Discussion on RAN Configuration and Reporting of QoE Measurement, 3GPP TSG-RAN WG3 #111-e, 25 Jan. 25-Feb. 4, 2021, R3-211013.

ISA, International Search Report for International Application No. PCT/CN2021/087103, Mail Date: Jan. 14, 2022. 9 pages.

Nokia et al. Consideration on QoE Scope 3GPP TSG-RAN WG 2 Meeting #113bis Electronic R2-2103555 Apr. 2, 2021 (5 pages).

OPPO Discussion on QoE Measurement Collection in NR 3GPP TSG-RAN WG2 Meeting #113bis Electronic R2-2103147 Apr. 2, 2021 (6 pages).

CNIPA, First Office Action for Chinese Application No. 202180057777.X, mailed on Mar. 15, 2026, 16 pages with unofficial English translation/.

3GPP, "3rd Generation Partnership Project; Technical Specification Group Radio Access Network; Study on NR QoE (Quality of Experience) management and optimizations for diverse services (Release 17)," 3GPP TR 38.890 V17.0.0, Apr. 2021, 18 pages.

MOIP, Office Action for Korean Application No. 10-2023-7035331, mailed on May 8, 2026, 11 pages with unofficial English translation.

* cited by examiner

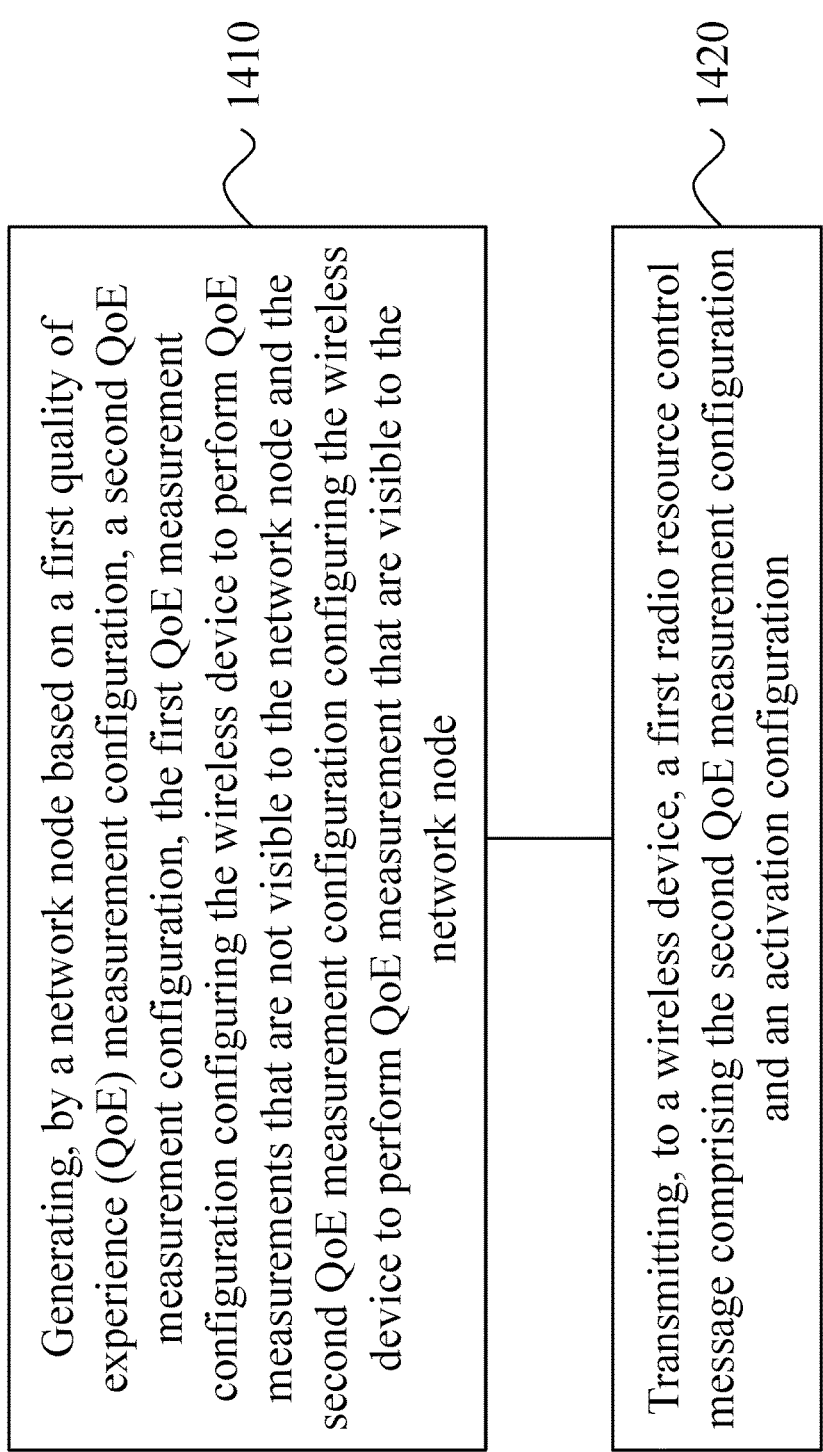

1400

Generating, by a network node based on a first quality of experience (QoE) measurement configuration, a second QoE measurement configuration, the first QoE measurement configuration configuring the wireless device to perform QoE measurements that are not visible to the network node and the second QoE measurement configuration configuring the wireless device to perform QoE measurement that are visible to the network node ∼ 1410

Transmitting, to a wireless device, a first radio resource control message comprising the second QoE measurement configuration and an activation configuration ∼ 1420

FIG. 14

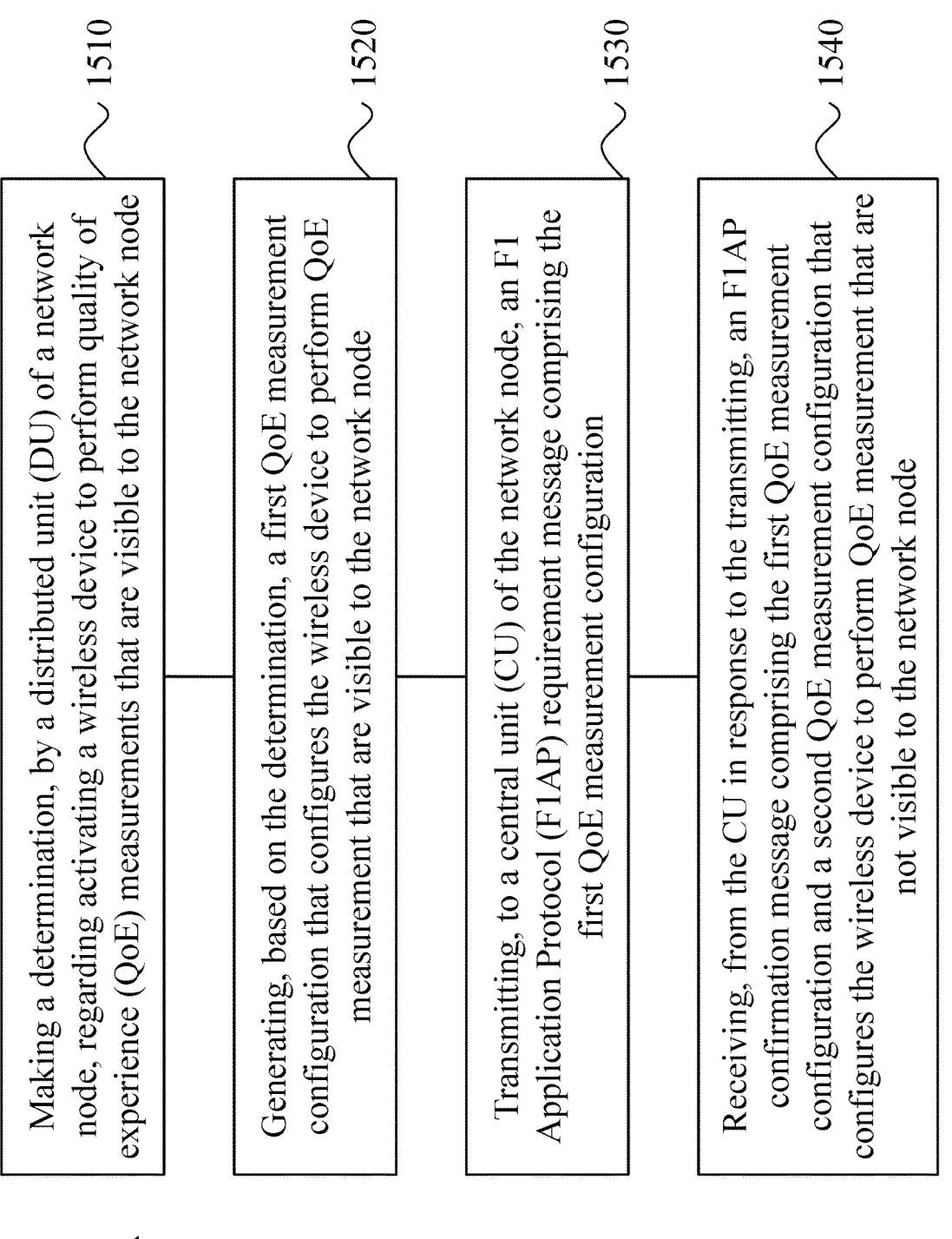

Making a determination, by a distributed unit (DU) of a network node, regarding activating a wireless device to perform quality of experience (QoE) measurements that are visible to the network node ⟵ 1510

Generating, based on the determination, a first QoE measurement configuration that configures the wireless device to perform QoE measurement that are visible to the network node ⟵ 1520

Transmitting, to a central unit (CU) of the network node, an F1 Application Protocol (F1AP) requirement message comprising the first QoE measurement configuration ⟵ 1530

Receiving, from the CU in response to the transmitting, an F1AP confirmation message comprising the first QoE measurement configuration and a second QoE measurement configuration that configures the wireless device to perform QoE measurement that are not visible to the network node ⟵ 1540

Transmitting, by a target network node to a source network node, an Xn Application Protocol (XnAP) message comprising a quality of experience (QoE) capability information of the target network node, a wireless device being configured, subsequent to the transmitting, to migrate from the source network node to the target network node

QUALITY OF EXPERIENCE MEASUREMENTS FOR RADIO ACCESS NETWORKS

CROSS REFERENCE TO RELATED APPLICATIONS

This patent document is a continuation of and claims benefit of priority to International Patent Application No. PCT/CN2021/087103, filed on Apr. 14, 2021. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques will provide an improved quality of experience for an increased number of users, which can be supported by both wireless devices and network nodes.

SUMMARY

This document relates to methods, systems, and devices for configuring quality-of-experience (QoE) measurements in mobile cellular networks, including 5th Generation (5G) and New Radio (NR) communication systems.

In one example aspect, a wireless communication method is disclosed. The method includes generating, by a network node based on a first quality of experience (QoE) measurement configuration, a second QoE measurement configuration, and transmitting, to a wireless device, a first radio resource control message comprising the second QoE measurement configuration and an activation configuration, wherein the first QoE measurement configuration configures the wireless device to perform QoE measurements that are not visible to the network node and the second QoE measurement configuration configures the wireless device to perform QoE measurement that are visible to the network node.

In another example aspect, a wireless communication method is disclosed. The method includes making a determination, by a distributed unit (DU) of a network node, regarding activating a wireless device to perform quality of experience (QoE) measurements that are visible to the network node, generating, based on the determination, a first QoE measurement configuration that configures the wireless device to perform QoE measurement that are visible to the network node, transmitting, to a central unit (CU) of the network node, an F1 Application Protocol (F1AP) requirement message comprising the first QoE measurement configuration, and receiving, from the CU in response to the transmitting, an F1AP confirmation message comprising the first QoE measurement configuration and a second QoE measurement configuration that configures the wireless device to perform QoE measurement that are not visible to the network node.

In yet another example aspect, a wireless communication method is disclosed. The method includes transmitting, by a target network node to a source network node, an Xn Application Protocol (XnAP) message comprising a quality of experience (QoE) capability information of the target network node, wherein a wireless device is configured, subsequent to the transmitting, to migrate from the source network node to the target network node.

In yet another example aspect, a wireless communication method is disclosed. The method includes generating, by a network node, a quality of experience (QoE) measurement retrieval configuration that configures a wireless device to retrieve QoE measurements that are visible to the network node, transmitting, to the wireless device, a first radio resource control message comprising the QoE measurement retrieval configuration, and receiving, from the wireless device, a second radio resource control message comprising a QoE evaluation result, wherein the wireless device is configured to generate the QoE evaluation result based on the QoE measurements.

In yet another example aspect, the above-described methods are embodied in the form of processor-executable code and stored in a computer-readable program medium.

In yet another example embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIGS. 14-17 show examples of wireless communication methods.

US 12,696,117 B2

3

Figure 18:
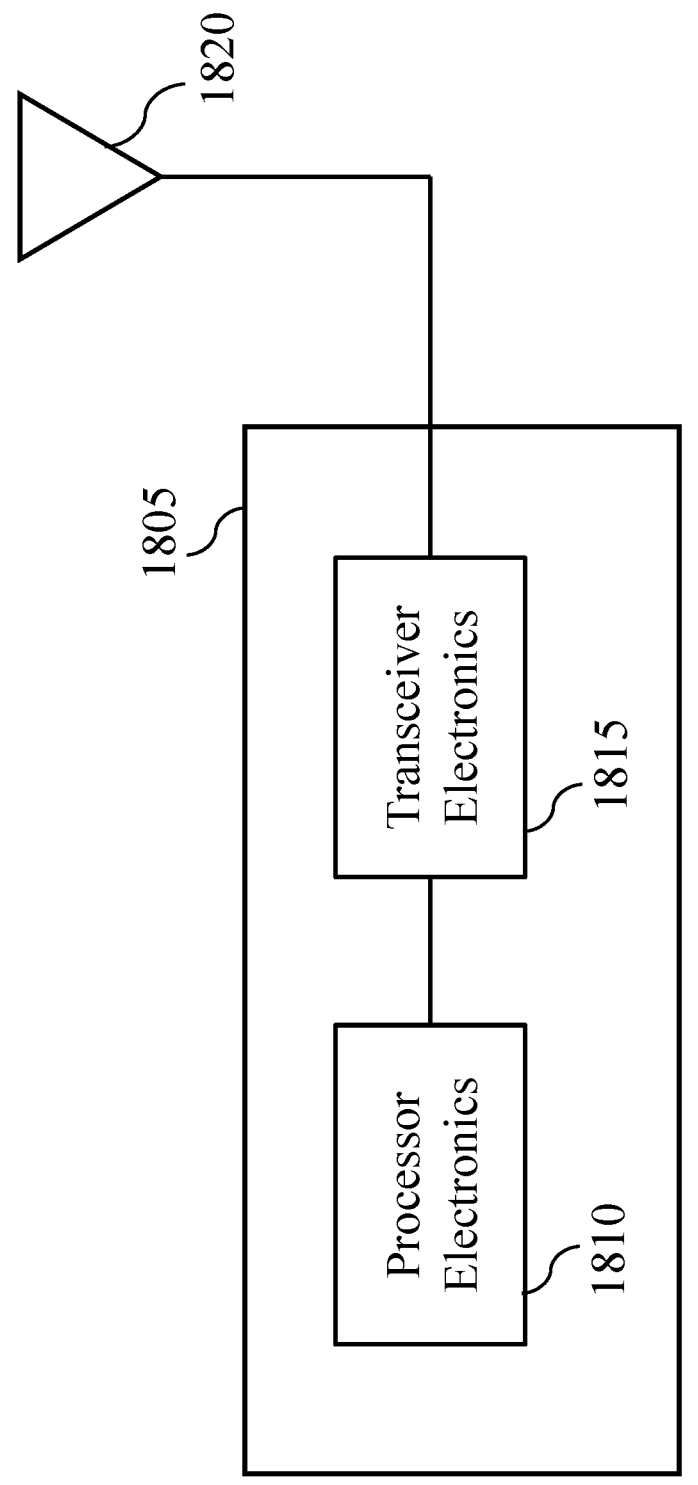

FIG. 18 is a block diagram representation of a portion of an apparatus that can be configured to implement some embodiments of the presently disclosed technology.

DETAILED DESCRIPTION

Existing NR implementations deploy quality-of-experience (QoE) techniques, which focuses on the actual individual user experience; e.g., did the network actually deliver a sufficient end-user experience? Broadly speaking, QoE looks at the impact of the network behavior on the end user, a fuzzier domain where certain network imperfections go unnoticed but others may render an application essentially useless. QoE achieves its goal by looking at the information within the data sent over the network, not just the efficiency of data transport across the network itself. For a VoIP call, for example, QoE might look at echo, conversational quality, audio level and imperfections.

However, in current NR implementations, QoE measurement reports are transferred as a container to the RAN node (or RAN-side, or simply RAN), which results in the QoE measurement results collected by the UE not being visible to the RAN. As user demand for better QoE increases, one solution is to enable the QoE measurement results to be used by RAN node for its own optimization. Embodiments of the disclosed technology described methods that render QoE measurement visible to the RAN-side by implementing, for example, activation, deactivation, reporting, suspension, and mobility techniques.

Figure 1:
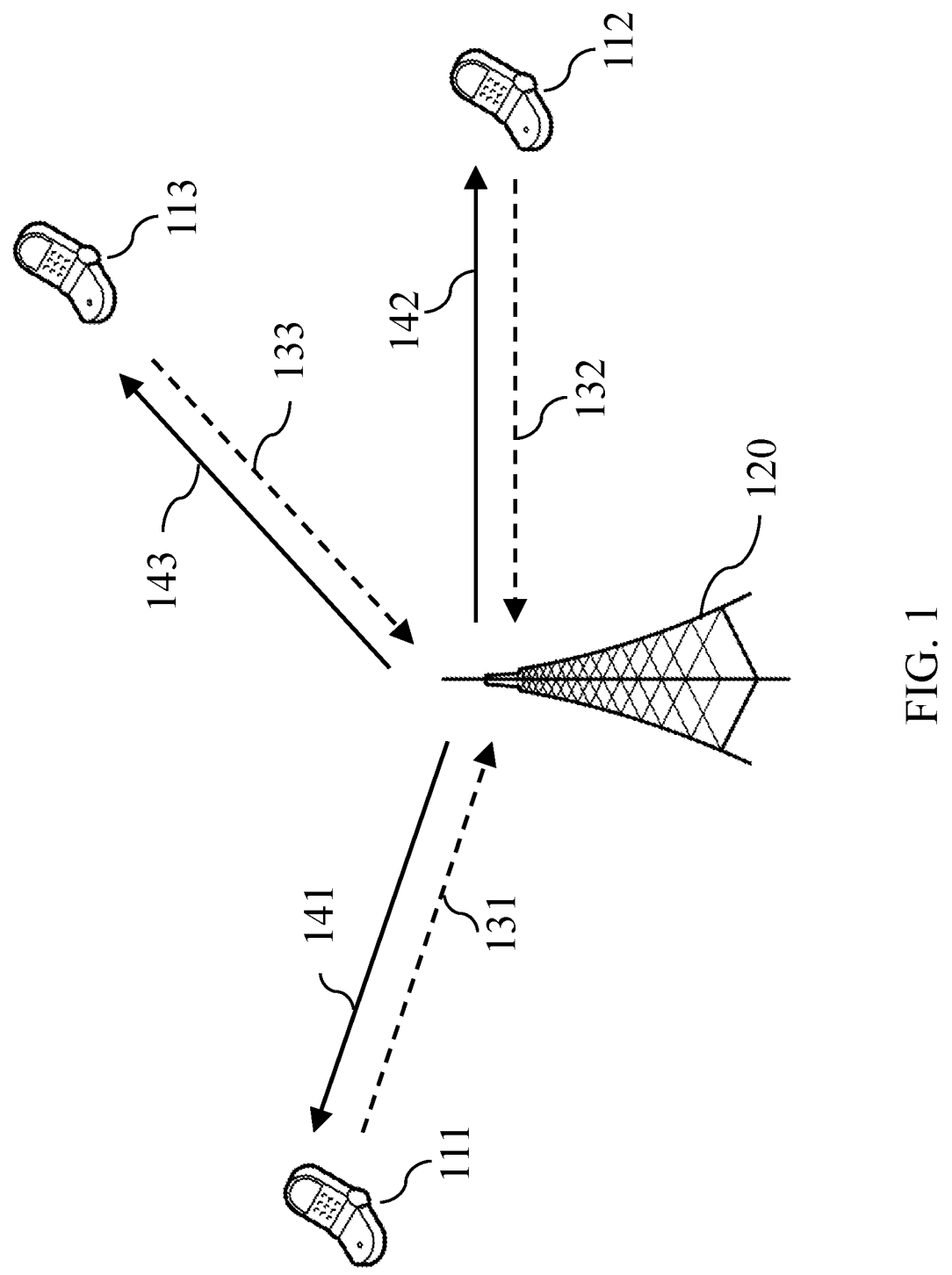
FIG. 1 shows an example of a base station (BS) and user equipment (UE) in wireless communication, in accordance with some embodiments of the presently disclosed technology.

FIG. 1 shows an example of a wireless communication system (e.g., an LTE, 5G or New Radio (NR) cellular network) that includes a BS 120 (e.g., gNB or network node) and one or more user equipment (UE) 111, 112 and 113 (or wireless devices, or mobile device). In some embodiments, the downlink transmissions (141, 142, 143) include a configuration for RAN-visible QoE measurements. In response, the UEs transmit (131, 132, 133) QoE measurement reports, results or evaluations to the BS 120. The UE may be, for example, a smartphone, a tablet, a mobile computer, a machine to machine (M2M) device, a terminal, a mobile device, an Internet of Things (IoT) device, and so on.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

1. Overview of QoE Techniques

For signaling-based QoE, the activation of QoE measurements is configured by Operations, Administration and Maintenance (OAM) and triggered by the 5G Core (5GC) or Core Network (CN). The CN initiates the activation of the QoE measurement configured by OAM, and sends the QoE measurement configuration to the NG-RAN node. The User Equipment (UE) Access Stratum (AS) layer receives the QoE measurement configuration from the NG-RAN node, and then sends the QoE measurement configuration to the UE application layer.

For management-based QoE measurements, the activation is configured and triggered by the OAM. The OAM sends the QoE measurement configuration to NG-RAN node, which sends the QoE measurement configuration to the AS layer of UE, which then sends the QoE measurement configuration to UE application layer. When a session starts, the application layer in UE checks the criteria (e.g. cell list, service type, etc.), and, if the criteria are met, starts the QoE measurement process and subsequent reporting process.

In the above described implementations, during QoE configuration and reporting, the information is transferred as a container to the RAN node, which results in both the configuration and reporting not being visible to the RAN.

For signaling-based QoE measurement deactivation, the deactivation is configured by OAM and triggered by CN. The CN initiates the deactivation of QoE measurement, as configured by OAM, and sends the deactivation indication to the NG-RAN node. The NG-RAN node sends the deactivation indication to the UE AS layer, which then sends the deactivation indication to the UE application layer.

For management-based QoE measurement, the deactivation is triggered by OAM. OAM sends the deactivation indication to NG-RAN node to indicate which QoE measurement should be deactivated. The NG-RAN node then sends the deactivation indication to the UE AS layer, which sends it to the application layer in UE.

2. Examples of RAN Configuring RAN-Visible QoE Measurements

Figure 2:
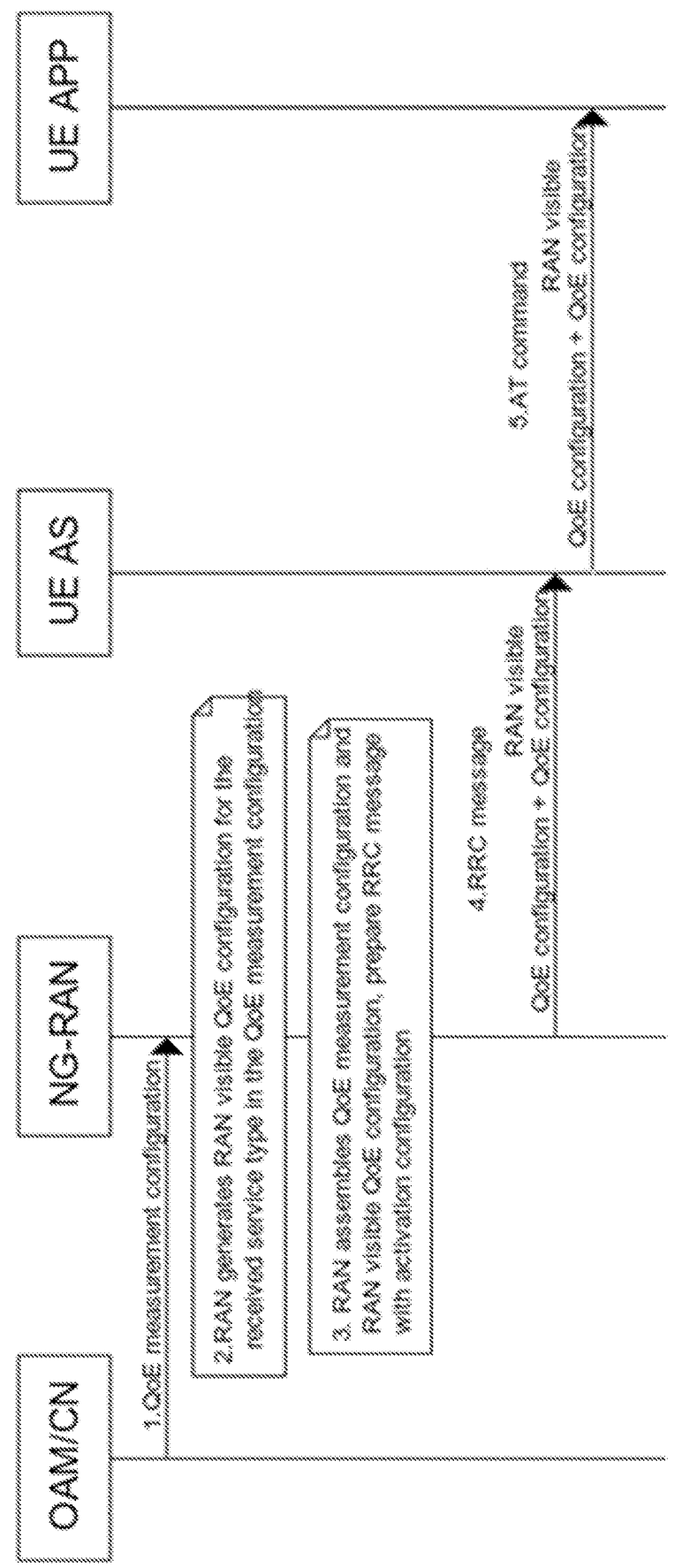
FIG. 2 shows an example timing diagram for the Radio Access Network (RAN) triggering the activation of RAN-visible quality-of-experience (QoE) measurements.

FIG. 2 shows an example timing diagram for the Radio Access Network (RAN) triggering the activation of RAN-visible quality-of-experience (QoE) measurements. In some embodiments, as shown in FIG. 2, the following steps are performed:

Step 1: The OAM/CN sends the QoE measurement configuration to the gNB-CU, which starts the activation procedure for QoE.

In some embodiments, the OAM/CN refers to two separated entities, i.e., the OAM or the CN. If the QoE configuration is sent from the CN, it is an example of signaling-based QoE, whereas if the QoE configuration is sent from the OAM, it is an example of management-based QoE. FIG. 2 represents the OAM and the CN as a single entity for simplicity.

Step 2: The NG-RAN node receives the QoE measurement configuration, which includes the service type. When the NG-RAN node decides to activate RAN-visible QoE, it generates the RAN-visible QOE configuration based on the corresponding service type received from the OAM. In some embodiments, the RAN-visible QoE configuration includes at least one of the following:

a RAN-visible QoE reference identifier, which enables the RAN-visible QoE measurement to be correlated with a specific QoE measurement a service type, which indicates the type of service that is recorded for the RAN node, e.g., Dynamic Adaptive Streaming over HTTP (DASH), Multimedia Telephony Service for IMS (MTSI), etc.

a target network, which indicates either a target Public Land Mobile Network (PLMN) or a target SNPN (Standalone Non-Public Network); this parameter defines the target network in which the RAN-visible QoE measurements are made by the UE a QoE collection RAN node, which defines the target RAN node to which the UE sends the RAN-visible QoE report a slice ID or a slice scope for QoE-visible QoE, which
defines the slice that is recorded for the RAN node RAN-visible QoE metrics, which are measured by the
UE and reported to the RAN node. In some embodi-
ments, the reported metrics are visible by RAN and
are useful to the RAN node for optimizing QoE. The
RAN-visible QoE metrics include at least one of the
following:

average round-trip time of the packets;

application name or application identifier;

average throughput;

initial playout delay, indicating the delay at the start
of the streaming of the presentation;

average jitter duration;

device information, which includes information
about the displayed video resolution as well as the
physical screen characteristics;

average buffer level, indicating the buffer occupancy
of the playout; or average frame rate, which indicates the video play-
back frame rate.

a RAN-visible QoE values indication, which indicates
the UE to report, to the RAN node, the calculated
numeric QoE values or simplified qualitative repre-
sentations (e.g., "Good", "Moderate" or "Bad")
derived from specific QoE metrics a QoE values location, which indicates where the RAN
visible QoE values or qualitative representations
should be calculated, i.e., at the UE, the RAN node,
or the QoE Server a measurement duration, which indicates the time dura-
tion for RAN-visible QoE measurements in the UE,
and may include a start time and an end time of the
measurement collection operation or the measure-
ment cycle in the UE an area scope, which is used for mobility scenarios. In
some embodiments, this field is optional and if it is
not included in the RAN-visible QoE configuration,
the area scope of QoE measurements could be used
in mobility scenarios an area scope indication, which indicates whether the
RAN node or the UE is configured to check the area
scope in mobility scenarios a reporting period, indicating how often measurements
are collected/reported a report event trigger, which defines one or more
events that trigger a measurement report, e.g., a
QOE metric being above or below a predefined
threshold a reporting method, which includes periodic reporting,
event-triggered reporting, or one-time immediate
reporting (wherein RAN QoE measurements are
performed immediately based on the RAN-visible
QoE configuration, and reported once)

Step 3: The NG-RAN generates a Radio Resource Control
(RRC) message with the QoE measurement configu-
ration and RAN-visible QoE configuration.

Step 4: The NG-RAN node sends the RRC message to UE
AS layer.

Step 5: The UE AS layer sends the received configuration
for QoE and RAN visible QoE to UE application layer.

3. Overview of CU-DU Split in a Network Node

In some embodiments, a network node (e.g., gNB, RAN)
can be implemented using an architecture that splits the
Central Units (CUs) and Distributed Units (DUs). In an example, the DU is responsible for real time L1 and L2
scheduling functions, and the CU is responsible for non-real
time, higher L2 and L3 functions. The CU/DU split archi-
tecture can be deployed in several instantiations, depending
on network requirements, e.g., latency, throughput, etc.

4. Examples of CU Configuring RAN-Visible QoE
Measurements

Figure 3:
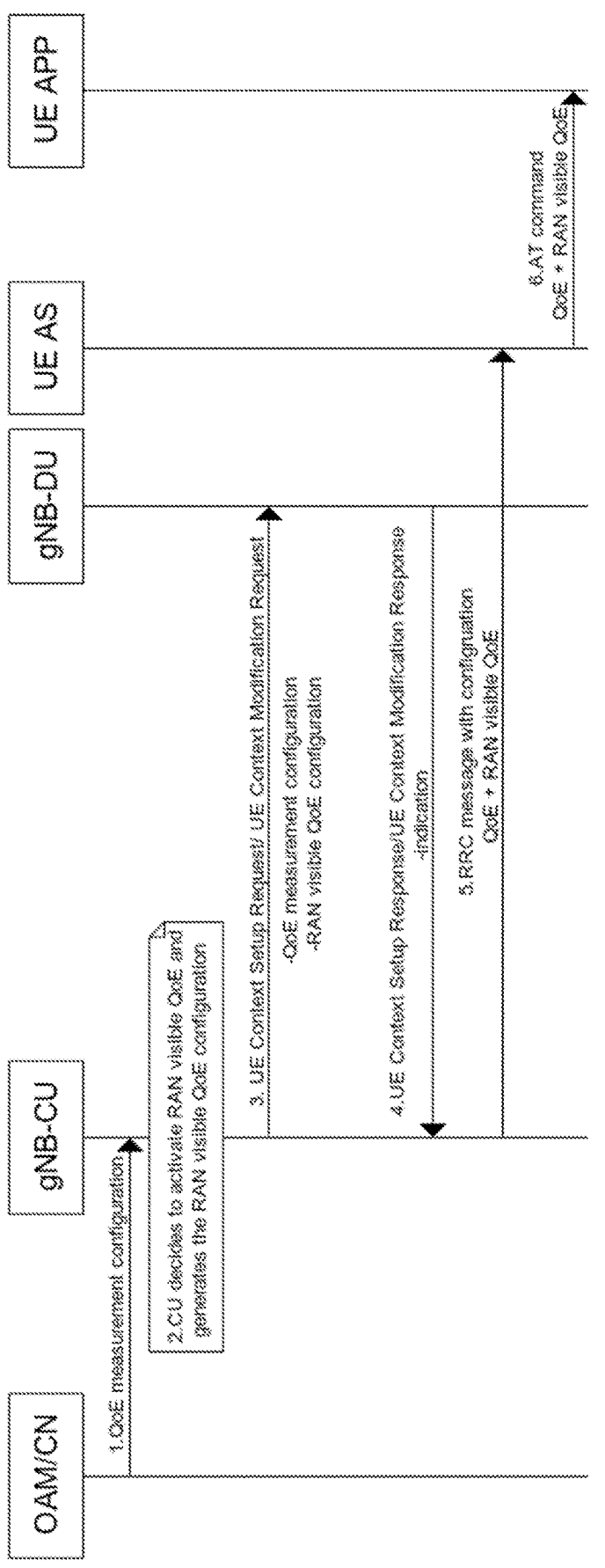
FIG. 3 shows an example timing diagram for a Central Unit of a RAN triggering the activation of RAN-visible QoE measurements.

FIG. 3 shows an example timing diagram for a Central
Unit of a RAN triggering the activation of RAN-visible QoE
measurements. In some embodiments, as shown in FIG. 3,
the following steps are performed:

Step 1: The OAM/CN sends the QoE measurement con-
figuration to the gNB-CU, which starts the activation
procedure for QoE.

Step 2: The gNB-CU receives the QoE measurement
configuration and decides to activate the RAN-visible
QoE. The gNB-CU generates the RAN-visible QoE
configuration which includes at least one of the fol-
lowing:

a RAN-visible QoE reference identifier, which enables
the RAN-visible QoE measurement to be correlated
with a specific QoE measurement a service type, which indicates the type of service that
is recorded for the RAN node, e.g., Dynamic Adap-
tive Streaming over HTTP (DASH), Multimedia
Telephony Service for IMS (MTSI), etc.

a target network, which indicates either a target Public
Land Mobile Network (PLMN) or a target SNPN
(Standalone Non-Public Network); this parameter
defines the target network in which the RAN-visible
QoE measurements are made by the UE a QoE collection RAN node, which defines the target
RAN node to which the UE sends the RAN-visible
QoE report a slice ID or a slice scope for QoE-visible QoE, which
defines the slice that is recorded for the RAN node RAN-visible QoE metrics, which are measured by the
UE and reported to the RAN node. In some embodi-
ments, the reported metrics are visible by RAN and
are useful to the RAN node for optimizing QoE. The
RAN-visible QoE metrics include at least one of the
following:

average round-trip time of the packets;

application name or application identifier;

average throughput;

initial playout delay, indicating the delay at the start
of the streaming of the presentation;

average jitter duration;

device information, which includes information
about the displayed video resolution as well as the
physical screen characteristics;

average buffer level, indicating the buffer occupancy
of the playout; or average frame rate, which indicates the video play-
back frame rate.

a RAN-visible QoE values indication, which indicates
the UE to report, to the RAN node, the calculated
numeric QoE values or simplified qualitative repre-
sentations (e.g., "Good", "Moderate" or "Bad")
derived from specific QoE metrics a QoE values location, which indicates where the RAN
visible QoE values or qualitative representations
should be calculated, i.e., at the UE, the RAN node,
or the QoE Server a measurement duration, which indicates the time duration for RAN-visible QoE measurements in the UE, and may include a start time and an end time of the measurement collection operation or the measurement cycle in the UE an area scope, which is used for mobility scenarios. In some embodiments, this field is optional and if it is not included in the RAN-visible QoE configuration, the area scope of QoE measurements could be used in mobility scenarios an area scope indication, which indicates whether the RAN node or the UE is configured to check the area scope in mobility scenarios a reporting period, indicating how often measurements are collected/reported a report event trigger, which defines one or more events that trigger a measurement report, e.g., a QOE metric being above or below a predefined threshold a reporting method, which includes periodic reporting, event-triggered reporting, or one-time immediate reporting (wherein RAN QoE measurements are performed immediately based on the RAN-visible QoE configuration, and reported once)

Step 3: The gNB-CU sends an F1 Application Protocol (F1AP) message (e.g., UE Context Setup Request or UE Context Modification Request) to the gNB-DU, which includes the QoE measurement configuration and the RAN-visible QoE configuration.

Step 4: The gNB-DU sends an F1AP message (e.g., UE Context Setup Response or UE Context Modification Response) to the gNB-CU with an indication to notify gNB-CU that the DU has received the measurement configuration.

Step 5: The gNB-CU sends an RRC message to the UE AS layer, which includes the QoE measurement configuration and RAN-visible QoE configuration.

Step 6: The UE AS layer sends the QoE measurement configuration and RAN-visible QoE configuration to UE application layer.

5. Examples of DU Configuring RAN-Visible QoE Measurements

Figure 4:
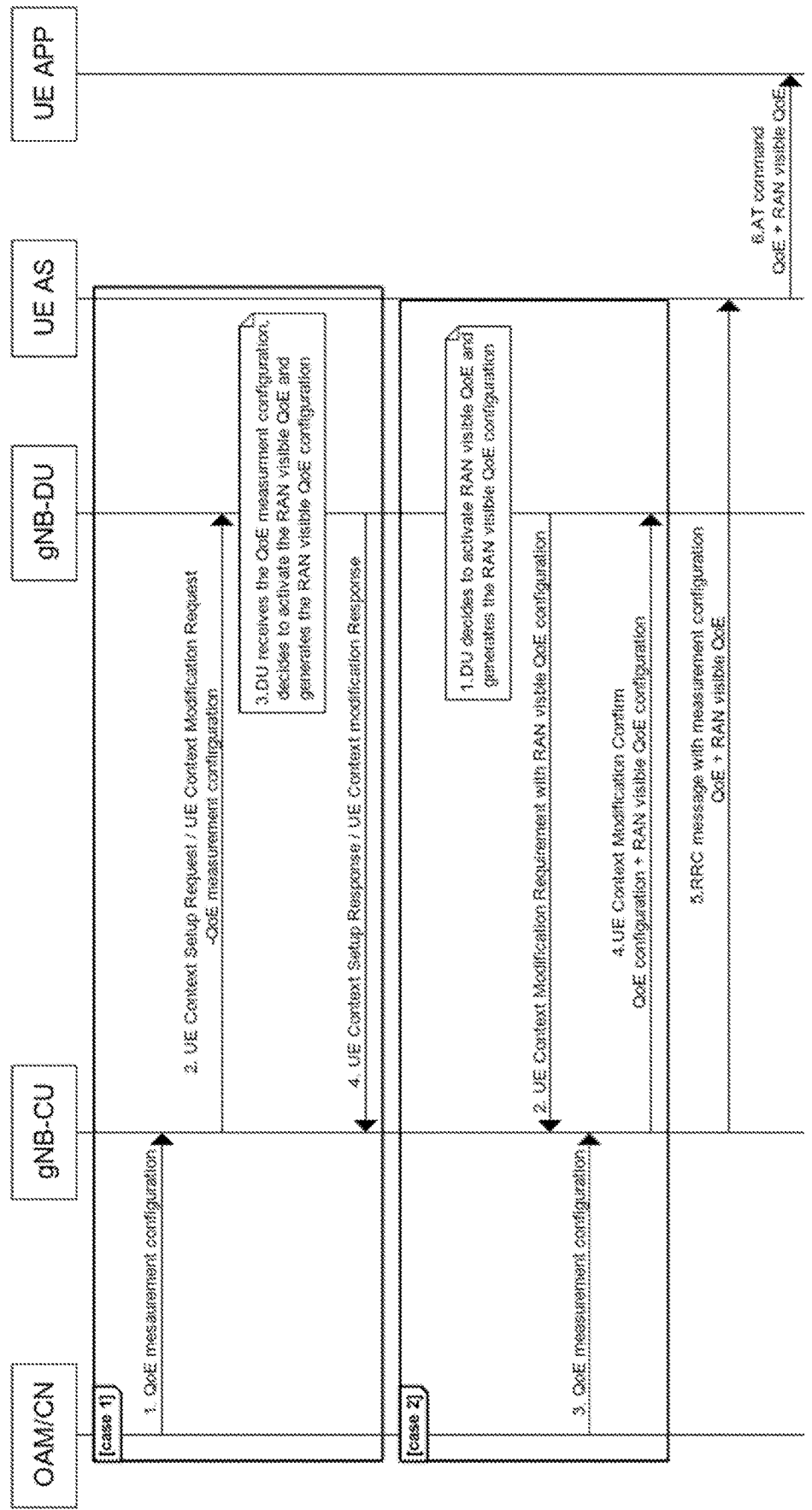
FIG. 4 shows an example timing diagram for a Distributed Unit (DU) of a RAN triggering the activation of RAN-visible QoE measurements.

FIG. 4 shows an example timing diagram for a Distributed Unit (DU) of a RAN triggering the activation of RAN-visible QoE measurements. In some embodiments, as shown in FIG. 4, the following steps are performed:

Case 1. DU receives configuration and then activates

Step 1: The OAM/CN sends the QoE measurement configuration to the gNB-CU.

Step 2: The gNB-CU sends the DU an F1AP message (e.g., UE Context Setup Request or UE Context Modification Request), which includes the received QoE measurement configuration.

Step 3: The gNB-DU receives the QoE measurement configuration and decides to activate the RAN-visible QoE. The gNB-DU generates the configuration of the RAN-visible QoE, which includes at least one of the following:

a RAN-visible QoE reference identifier, which enables the RAN-visible QoE measurement to be correlated with a specific QoE measurement a service type, which indicates the type of service that is recorded for the RAN node, e.g., Dynamic Adaptive Streaming over HTTP (DASH), Multimedia Telephony Service for IMS (MTSI), etc.

a target network, which indicates either a target Public Land Mobile Network (PLMN) or a target SNPN (Standalone Non-Public Network); this parameter defines the target network in which the RAN-visible QoE measurements are made by the UE a QoE collection RAN node, which defines the target RAN node to which the UE sends the RAN-visible QoE report a slice ID or a slice scope for QoE-visible QoE, which defines the slice that is recorded for the RAN node RAN-visible QoE metrics, which are measured by the UE and reported to the RAN node. In some embodiments, the reported metrics are visible by RAN and are useful to the RAN node for optimizing QoE. The RAN-visible QoE metrics include at least one of the following:

average round-trip time of the packets;

application name or application identifier;

average throughput;

initial playout delay, indicating the delay at the start of the streaming of the presentation;

average jitter duration;

device information, which includes information about the displayed video resolution as well as the physical screen characteristics;

average buffer level, indicating the buffer occupancy of the playout; or average frame rate, which indicates the video playback frame rate.

a RAN-visible QoE values indication, which indicates the UE to report, to the RAN node, the calculated numeric QoE values or simplified qualitative representations (e.g., "Good", "Moderate" or "Bad") derived from specific QoE metrics a QoE values location, which indicates where the RAN visible QoE values or qualitative representations should be calculated, i.e., at the UE, the RAN node, or the QoE Server a measurement duration, which indicates the time duration for RAN-visible QoE measurements in the UE, and may include a start time and an end time of the measurement collection operation or the measurement cycle in the UE an area scope, which is used for mobility scenarios. In some embodiments, this field is optional and if it is not included in the RAN-visible QoE configuration, the area scope of QoE measurements could be used in mobility scenarios an area scope indication, which indicates whether the RAN node or the UE is configured to check the area scope in mobility scenarios a reporting period, indicating how often measurements are collected/reported a report event trigger, which defines one or more events that trigger a measurement report, e.g., a QOE metric being above or below a predefined threshold a reporting method, which includes periodic reporting, event-triggered reporting, or one-time immediate reporting (wherein RAN QoE measurements are performed immediately based on the RAN-visible QoE configuration, and reported once)

Step 4: The gNB-DU sends an F1AP message (e.g., UE Context Setup Response or UE Context Modification Response) to the gNB-CU with the RAN-visible QoE configuration.

Case 2. DU activates and then generates configuration

Step 1: The gNB-DU decides to activate RAN-visible QoE and generates RAN-visible QoE configuration, which includes at least one of the following:

a service type, which indicates the type of service that is recorded for the RAN node, e.g., Dynamic Adaptive Streaming over HTTP (DASH), Multimedia Telephony Service for IMS (MTSI), etc.

a target network, which indicates either a target Public Land Mobile Network (PLMN) or a target SNPN (Standalone Non-Public Network); this parameter defines the target network in which the RAN-visible QoE measurements are made by the UE a QoE collection RAN node, which defines the target RAN node to which the UE sends the RAN-visible QoE report a slice ID or a slice scope for QoE-visible QoE, which defines the slice that is recorded for the RAN node RAN-visible QoE metrics, which are measured by the UE and reported to the RAN node. In some embodiments, the reported metrics are visible by RAN and are useful to the RAN node for optimizing QoE. The RAN-visible QoE metrics include at least one of the following:

average round-trip time of the packets;

application name or application identifier;

average throughput;

initial playout delay, indicating the delay at the start of the streaming of the presentation;

average jitter duration;

device information, which includes information about the displayed video resolution as well as the physical screen characteristics;

average buffer level, indicating the buffer occupancy of the playout; or average frame rate, which indicates the video playback frame rate.

a RAN-visible QoE values indication, which indicates the UE to report, to the RAN node, the calculated numeric QoE values or simplified qualitative representations (e.g., "Good", "Moderate" or "Bad") derived from specific QoE metrics a QoE values location, which indicates where the RAN visible QoE values or qualitative representations should be calculated, i.e., at the UE, the RAN node, or the QoE Server a measurement duration, which indicates the time duration for RAN-visible QoE measurements in the UE, and may include a start time and an end time of the measurement collection operation or the measurement cycle in the UE an area scope, which is used for mobility scenarios. In some embodiments, this field is optional and if it is not included in the RAN-visible QoE configuration, the area scope of QoE measurements could be used in mobility scenarios an area scope indication, which indicates whether the RAN node or the UE is configured to check the area scope in mobility scenarios a reporting period, indicating how often measurements are collected/reported a report event trigger, which defines one or more events that trigger a measurement report, e.g., a QOE metric being above or below a predefined threshold a reporting method, which includes periodic reporting, event-triggered reporting, or one-time immediate reporting (wherein RAN QoE measurements are performed immediately based on the RAN-visible QoE configuration, and reported once)

Step 2: The gNB-DU sends an F1AP message (e.g., UE Context Modification Requirement), which includes RAN-visible QoE measurement configuration, to the gNB-CU.

Step 3: The OAM/CN sends the QoE measurement configuration to the gNB-CU.

Step 4: The gNB-CU receives the QoE measurement configuration from the OAM/CN and sends an F1AP message (e.g., UE Context Modification Confirm), which includes the QoE measurement configuration and the RAN-visible QoE configuration, to the gNB-DU. The RAN-visible QoE configuration includes at least one of the following:

a RAN-visible QoE reference identifier, which enables the RAN-visible QoE measurement to be correlated with a specific QoE measurement a service type, which indicates the type of service that is recorded for the RAN node, e.g., Dynamic Adaptive Streaming over HTTP (DASH), Multimedia Telephony Service for IMS (MTSI), etc.

a target network, which indicates either a target Public Land Mobile Network (PLMN) or a target SNPN (Standalone Non-Public Network); this parameter defines the target network in which the RAN-visible QoE measurements are made by the UE a QoE collection RAN node, which defines the target RAN node to which the UE sends the RAN-visible QoE report a slice ID or a slice scope for QoE-visible QoE, which defines the slice that is recorded for the RAN node RAN-visible QoE metrics, which are measured by the UE and reported to the RAN node. In some embodiments, the reported metrics are visible by RAN and are useful to the RAN node for optimizing QoE. The RAN-visible QoE metrics include at least one of the following:

average round-trip time of the packets;

application name or application identifier;

average throughput;

initial playout delay, indicating the delay at the start of the streaming of the presentation;

average jitter duration;

device information, which includes information about the displayed video resolution as well as the physical screen characteristics;

average buffer level, indicating the buffer occupancy of the playout; or average frame rate, which indicates the video playback frame rate.

a RAN-visible QoE values indication, which indicates the UE to report, to the RAN node, the calculated numeric QoE values or simplified qualitative representations (e.g., "Good", "Moderate" or "Bad") derived from specific QoE metrics a QoE values location, which indicates where the RAN visible QoE values or qualitative representations should be calculated, i.e., at the UE, the RAN node, or the QoE Server a measurement duration, which indicates the time duration for RAN-visible QoE measurements in the UE, and may include a start time and an end time of the measurement collection operation or the measurement cycle in the UE an area scope, which is used for mobility scenarios. In some embodiments, this field is optional and if it is not included in the RAN-visible QoE configuration, the area scope of QoE measurements could be used in mobility scenarios an area scope indication, which indicates whether the RAN node or the UE is configured to check the area scope in mobility scenarios a reporting period, indicating how often measurements are collected/reported a report event trigger, which defines one or more events that trigger a measurement report, e.g., a QOE metric being above or below a predefined threshold a reporting method, which includes periodic reporting, event-triggered reporting, or one-time immediate reporting (wherein RAN QoE measurements are performed immediately based on the RAN-visible QoE configuration, and reported once)

Step 5: The gNB-CU sends an RRC message, which includes the QoE measurement configuration and the RAN-visible QoE configuration, to the UE AS layer.

Step 6: The UE AS layer sends the QoE measurement configuration and the RAN-visible QoE configuration to the UE application layer.

6. Examples of RAN Deactivating RAN-Visible QoE Measurements

Figure 5:
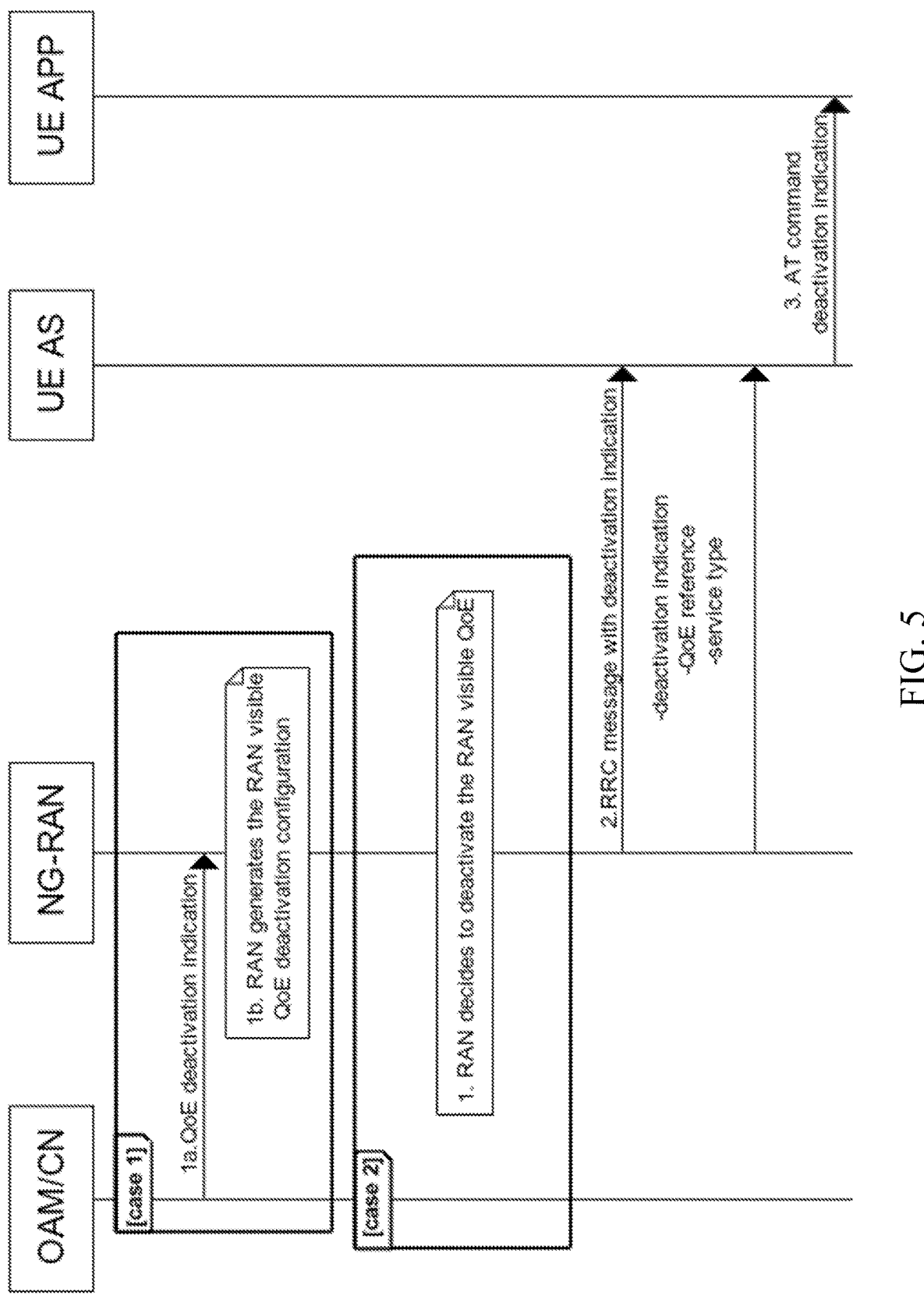
FIGS. 5-7 show example timing diagrams for the RAN, CU, and DU deactivating RAN-visible QoE measurements, respectively.

FIG. 5 shows an example timing diagram for the RAN deactivating RAN-visible QoE measurements. In some embodiments, as shown in FIG. 5, the following steps are performed:

Case 1. Once the NG-RAN node receives the QoE deactivation indication, it decides to deactivate both the QoE and RAN-visible QoE, i.e., the RAN-visible QoE deactivation is triggered by the deactivation indication of the QoE.

Step 1a: The OAM/CN sends the QoE deactivation indication to the RAN node.

Step 1b: The NG-RAN node receives the QoE deactivation indication and decides to deactivate the QoE measurement and the RAN-visible QoE together. The NG-RAN node generates the configuration for deactivation, which includes at least one of the following:

a deactivation indication, which indicates the deactivation of both QoE and RAN-visible QoE;

a RAN-visible QoE reference identifier, indicating the related QoE reference of a QoE measurement for RAN-visible QoE; or a service type, to deactivate the RAN-visible QoE of the specified service.

Case 2. The RAN node may not receive deactivation of the QoE, and the NG-RAN node decides to deactivate RAN visible QoE itself Step 1: The NG-RAN node decides to deactivate the RAN-visible QoE itself and generates the RAN visible QoE deactivation configuration, which includes at least one of the following:

a deactivation indication, which indicates the deactivation of both QoE and RAN-visible QoE;

a RAN-visible QoE reference identifier, indicating the related QoE reference of a QoE measurement for RAN-visible QoE; or a service type, to deactivate the RAN-visible QoE of the specified service.

Step 2: The NG-RAN node sends an RRC message to the UE, with the deactivation indication decided in Step 1 for both Case 1 and Case 2.

Step 3: The UE AS layer sends the received deactivation indication to UE application layer. The UE deletes the specified RAN-visible QoE measurement and/or QoE measurement configuration, and permanently stops the specified RAN visible QoE and/or QoE.

7. Examples of CU Deactivating RAN-Visible QoE Measurements

Figure 6:
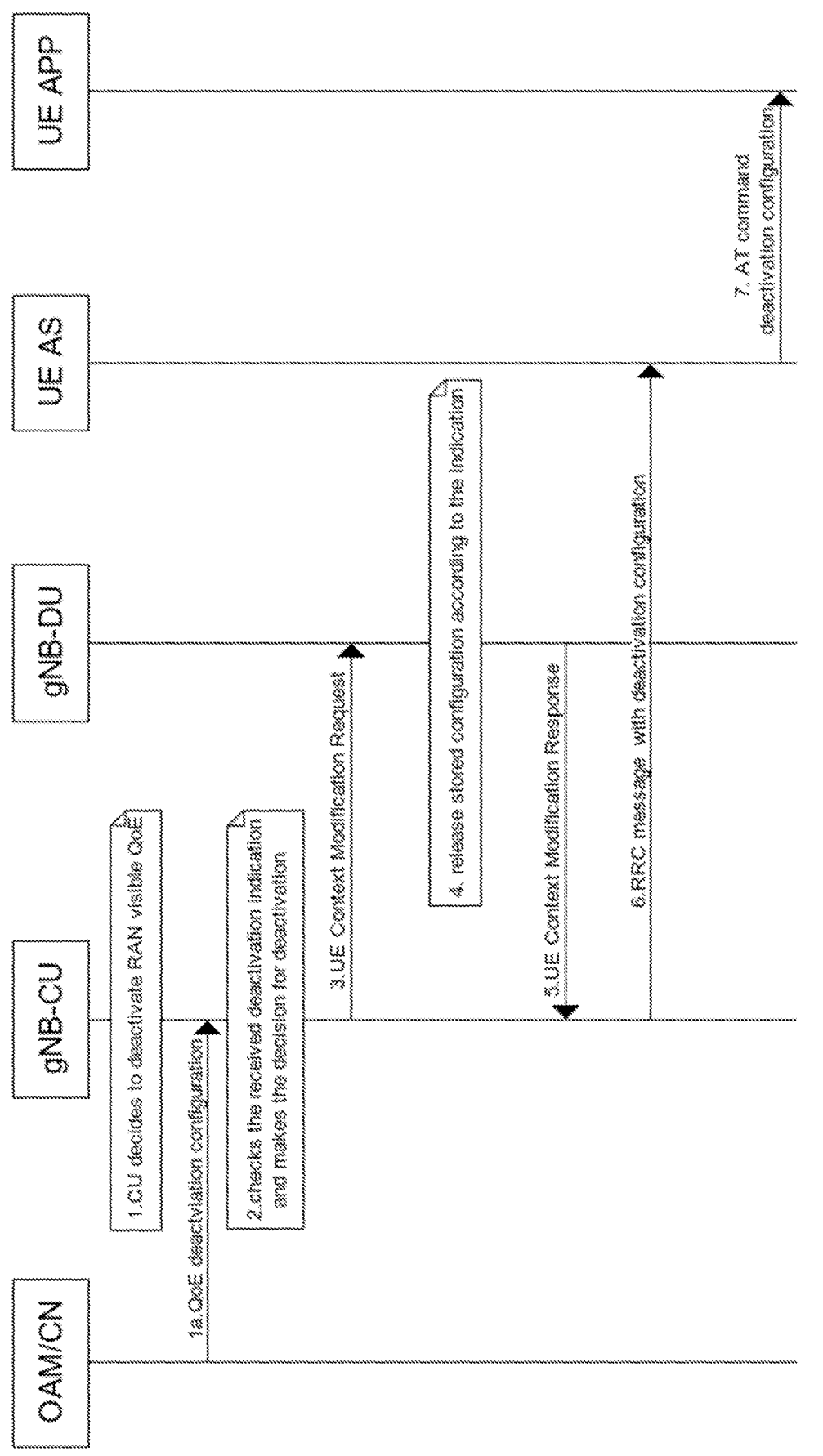

FIG. 6 shows an example timing diagram for the CU deactivating RAN-visible QoE measurements. In some embodiments, as shown in FIG. 6, the following steps are performed:

Step 1: The gNB-CU decides to deactivate the RAN-visible QoE.

Step 1a: Before or after the gNB-CU node decides to deactivate RAN visible QoE, the OAM/CN might send QoE deactivation configuration to gNB-CU, with an indication to deactivate the QoE measurement.

Step 2: The gNB-CU makes the decision to deactivate and assembles the configuration for deactivation, which can include at least one of the following:

a deactivation indication, which indicates the deactivation of both QoE and RAN-visible QoE, or to deactivate the RAN-visible QoE only;

a RAN-visible QoE reference identifier, indicating the related QoE reference of a QoE measurement for RAN-visible QoE; or a service type, to deactivate the RAN-visible QoE of the specified service.

Step 3: The gNB-CU sends an F1AP message (e.g., UE Context Modification Request) to the gNB-DU with the deactivation configuration generated in Step 2.

Step 4: The gNB-DU releases the related QoE configuration based on the received deactivation configuration.

Step 5: The gNB-DU sends an F1AP message (e.g., UE Context Modification Response) to the gNB-CU with an indication to notify the gNB-CU that the DU has released the related configuration based on the deactivation configuration.

Step 6: gNB-CU sends RRC message to the UE with the deactivation configuration.

Step 7: The UE AS layer sends the deactivation configuration to the UE application layer. The UE deletes the specified RAN-visible QoE measurement and/or QoE measurement configuration, and permanently stops the specified RAN-visible QoE and/or QoE.

8. Examples of DU Deactivating RAN-Visible QoE Measurements

Figure 7:
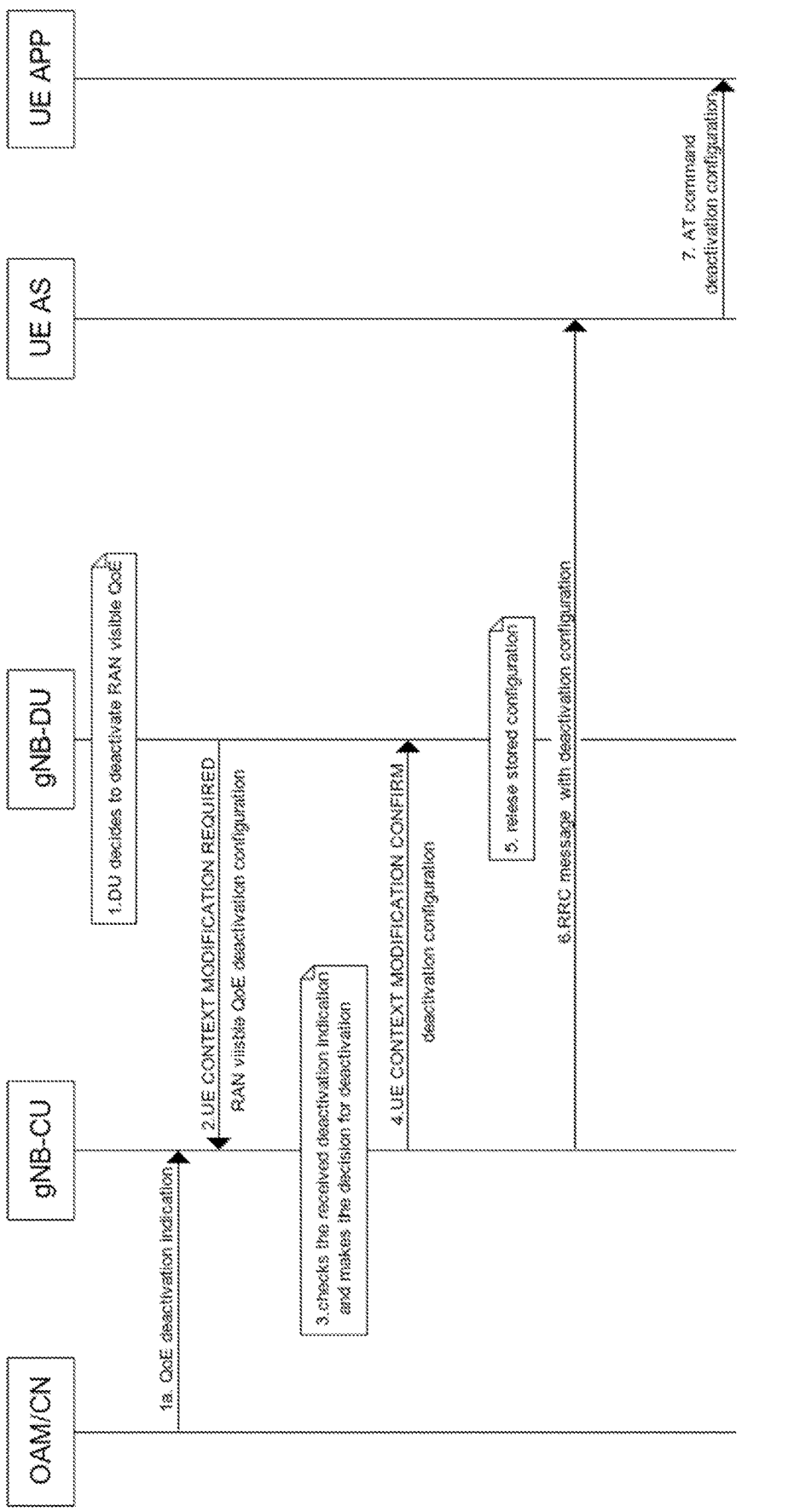

FIG. 7 shows an example timing diagram for the DU deactivating RAN-visible QoE measurements. In some embodiments, as shown in FIG. 7, the following steps are performed:

Step 1: The gNB-DU decides to deactivate the RAN-visible QoE and generates the RAN-visible QoE deactivation configuration, which contains at least one of the following items:

a deactivation indication, indicating the deactivation of the RAN-visible QoE;

a RAN-visible QoE reference identifier, indicating the related QoE reference of a QoE measurement for RAN-visible QoE; or a service type, to deactivate the RAN-visible QoE of the specified service.

Step 1a: Before or after the gNB-DU node decides to deactivate RAN visible QoE, the OAM/CN might send the QoE deactivation configuration to the gNB-CU, with an indication to deactivate the QoE measurement.

Step 2: The gNB-DU sends an F1AP message (e.g., UE Context Modification Required) to the gNB-CU, with the RAN-visible deactivation configuration generated in Step 1.

Step 3: The gNB-CU checks the received deactivation configuration, makes the decision to deactivate, and assembles the configuration for deactivation, which includes at least one of the following:

a deactivation indication, which indicates the deactivation of both QoE and RAN-visible QoE, or to deactivate the RAN-visible QoE only;

a RAN-visible QoE reference identifier, indicating the related QoE reference of a QoE measurement for RAN-visible QoE; or a service type, to deactivate the RAN-visible QoE of the specified service.

Step 4: The gNB-CU sends an F1AP message (e.g., UE Context Modification Confirm) to the gNB-DU, with the deactivation configuration generated in Step 3.

Step 5: The gNB-DU releases the related QoE configuration based on the received deactivation configuration.

Step 6: The gNB-CU sends RRC message to UE with deactivation configuration.

Step 7: The UE AS layer sends the deactivation configuration to the UE application layer. The UE deletes the specified RAN-visible QoE measurement and/or QoE measurement configuration, and permanently stops the specified RAN-visible QoE and/or QoE.

9. Examples of CU/DU Suspending/Resuming RAN-Visible QoE Measurements

Figure 8:
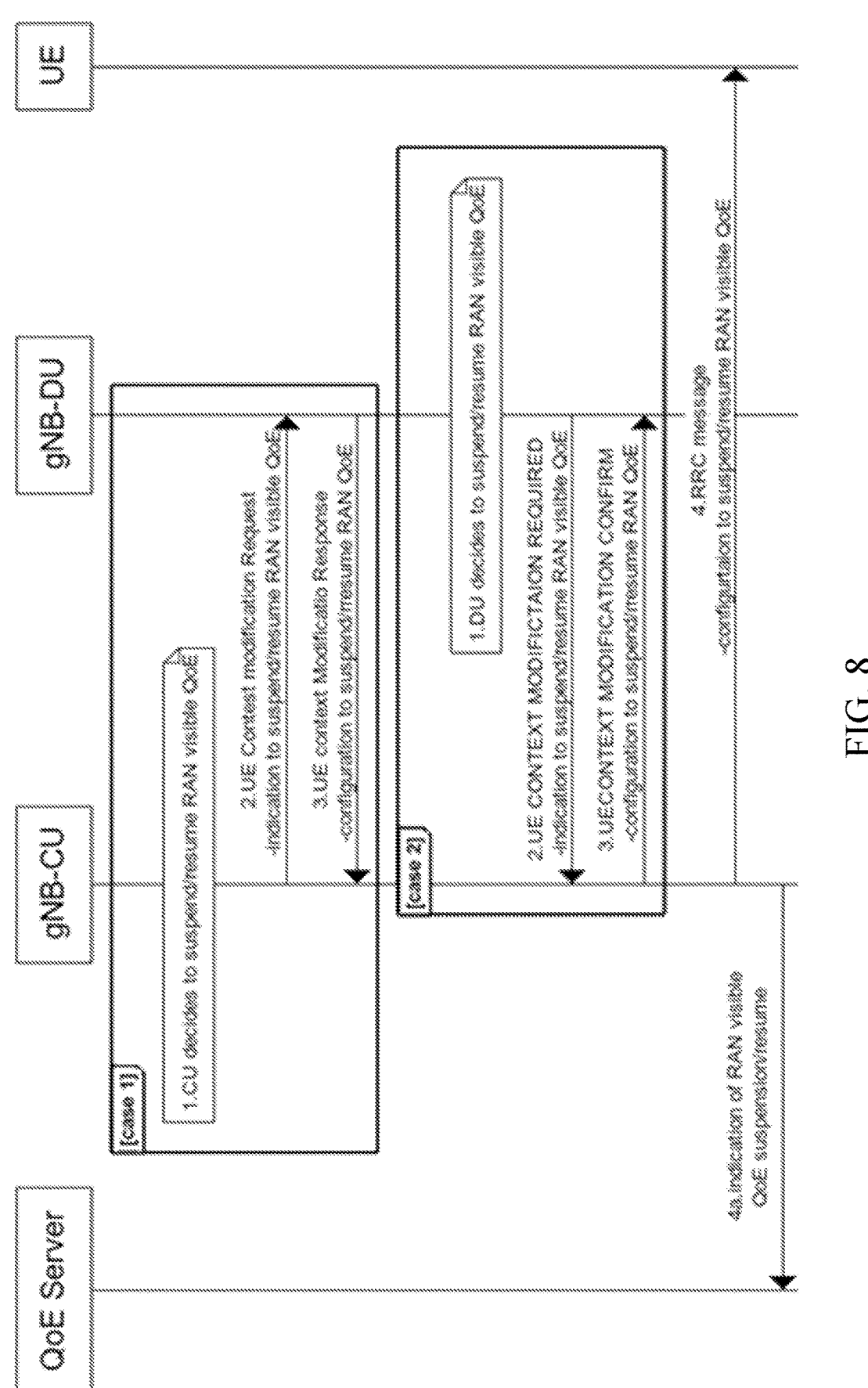
FIG. 8 shows an example timing diagram for the suspension and resumption of RAN-visible QoE measurements by the CU and the DU.

FIG. 8 shows an example timing diagram for the suspension and resumption of RAN-visible QoE measurements by the CU and the DU. In some embodiments, as shown in FIG. 8, the following steps are performed:

Case 1. CU decides to suspend/resume

Step 1: The gNB-CU decides to suspend/resume the RAN-visible QoE.

Step 2: The gNB-CU sends an F1AP message (e.g., UE Context Modification Request message) to the gNB-DU, which includes a configuration to suspend/resume RAN-visible QoE measurement. In some embodiments, the configuration includes at least one of the following:

an indication to suspend/resume RAN-visible QoE;

a RAN-visible QoE reference identifier, indicating the related QoE reference of a QoE measurement for RAN-visible QoE; or a service type, used to suspend/resume RAN-visible QoE of specified service.

Step 3: The gNB-DU sends a response message (e.g., UE Context Requirement Response) to the gNB-CU.

Case 2. DU decides to suspend/resume

Step 1: The gNB-DU decides to suspend/resume the RAN-visible QoE.

Step 2: The gNB-DU sends an F1AP message (e.g., UE Context Modification Required message) to the gNB-CU, which includes a configuration to suspend/resume RAN-visible QoE measurement. In some embodiments, the configuration include at least one of the following:

an indication to suspend/resume RAN-visible QoE;

a RAN-visible QoE reference identifier, indicating the related QoE reference of a QoE measurement for RAN-visible QoE; or a service type, used to suspend/resume RAN-visible QoE of specified service.

Step 3: gNB-CU sends a response message (e.g., UE Context Requirement Confirm) to the gNB-DU to confirm the requirement of suspending/resuming the RAN-visible QoE.

Step 4: The gNB-CU sends an RRC message (e.g. RRC Reconfiguration message) to the UE, which includes the configuration to suspend/resume the RAN-visible QoE.

Step 4a: The gNB-CU sends an indication to suspend/resume RAN-visible QoE to QoE Server. If the indication to suspend a specific RAN-visible QoE measurement is received, the UE temporarily stops the specific RAN-visible QoE.

10. Examples of Reporting RAN-Visible QoE Measurements

Figure 9:
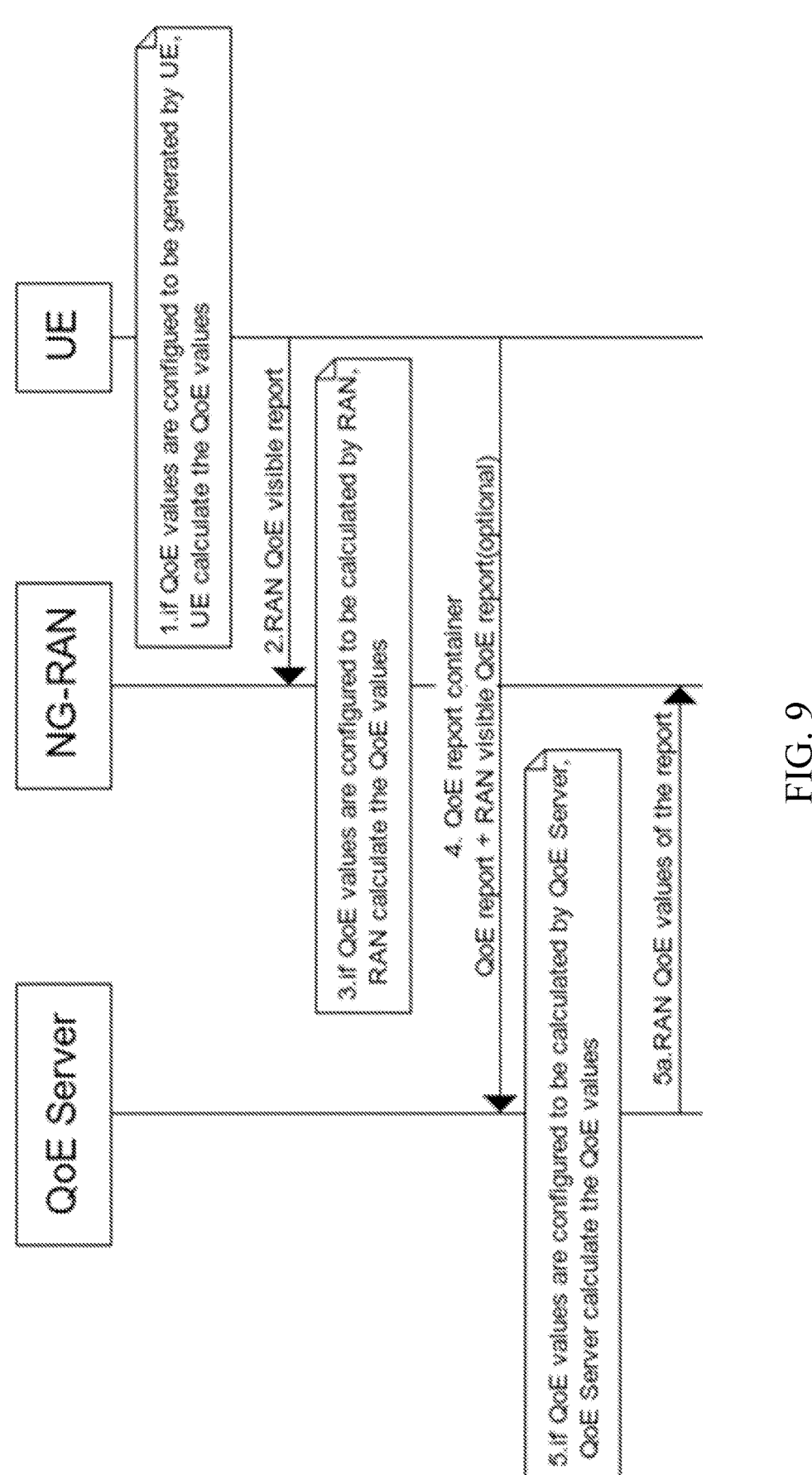
FIG. 9 shows an example timing diagram for reporting RAN-visible QoE measurements.

FIG. 9 shows an example timing diagram for reporting RAN-visible QoE measurements. In some embodiments, the RAN-visible QoE report includes the measurement results collected by the UE, which can be used by the RAN node. In an example, the RAN-visible QoE report includes at least one of the following:

RAN-visible QoE metrics, which are a subset of QoE metrics directly collected by the UE, e.g., round-trip time, jitter duration, average throughput, device information, codec information, and so on;

RAN-visible QoE values, which include a set of values calculated from the RAN-visible QoE metrics. In an example, the RAN-visible QoE values include a comprehensive index that enables evaluation of the RAN-visible QoE results. In another example, the RAN-visible QoE values could be calculated by the UE, the RAN node, or the QoE Server. In yet another example, the RAN-visible QoE values can be objective qualitative representations (e.g., "Good", "Moderate" or "Bad") that are generated based on some evaluation principles;

a Protocol Data Unit (PDU) session Id;

a Slice id;

a target RAN node;

a UE ID;

UE location information; or a reported time stamp.

In some embodiments, as shown in FIG. 9, the following steps are performed:

Step 1: The UE collects the RAN-visible QoE measurement results and prepares the QoE report. If the QoE values are configured to be generated by the UE, the UE calculates the RAN-visible QoE values and then prepares the QoE report. In some embodiments, the UE checks the reporting method in the RAN-visible QoE configuration.

If the reporting method is configured to be periodic, then the UE sends the RAN-visible QoE reports to NG-RAN node periodically.

If the reporting method is configured to be event-triggered, then the UE sends the RAN-visible QoE reports to NG-RAN node when triggered by specific event.

If the reporting method is configured to be a one-time immediate report, then the UE perform only the RAN QoE measurements immediately based on the RAN-visible QoE configuration, and reports once. After reporting to NG-RAN node, the UE deletes the RAN-visible QoE configuration.

Step 2: The UE sends the RAN-visible QoE report to the NG-RAN node.

Step 3: The NG-RAN node calculates the RAN-visible QoE values, if the RAN-visible QoE values are configured to be generated by the RAN node.

Step 4: The UE sends the QoE report container to the QoE Server. The QoE report container includes the following:

a QoE report; or an optional RAN-visible QoE report.

In some embodiments, only when the QoE Server is configured to require the RAN-visible QoE report, the QoE report container includes the RAN-visible QoE report.

Step 5: The QoE Server calculates the RAN visible QoE values, if the RAN-visible QoE values are configured to be generated by QoE Server.

Step 5a: After calculating the RAN-visible QoE values, the QoE Server sends the RAN-visible QoE values of the report to the NG-RAN node.

11. Examples of RAN-Visible QoE Capability Information Exchange

Figure 10:
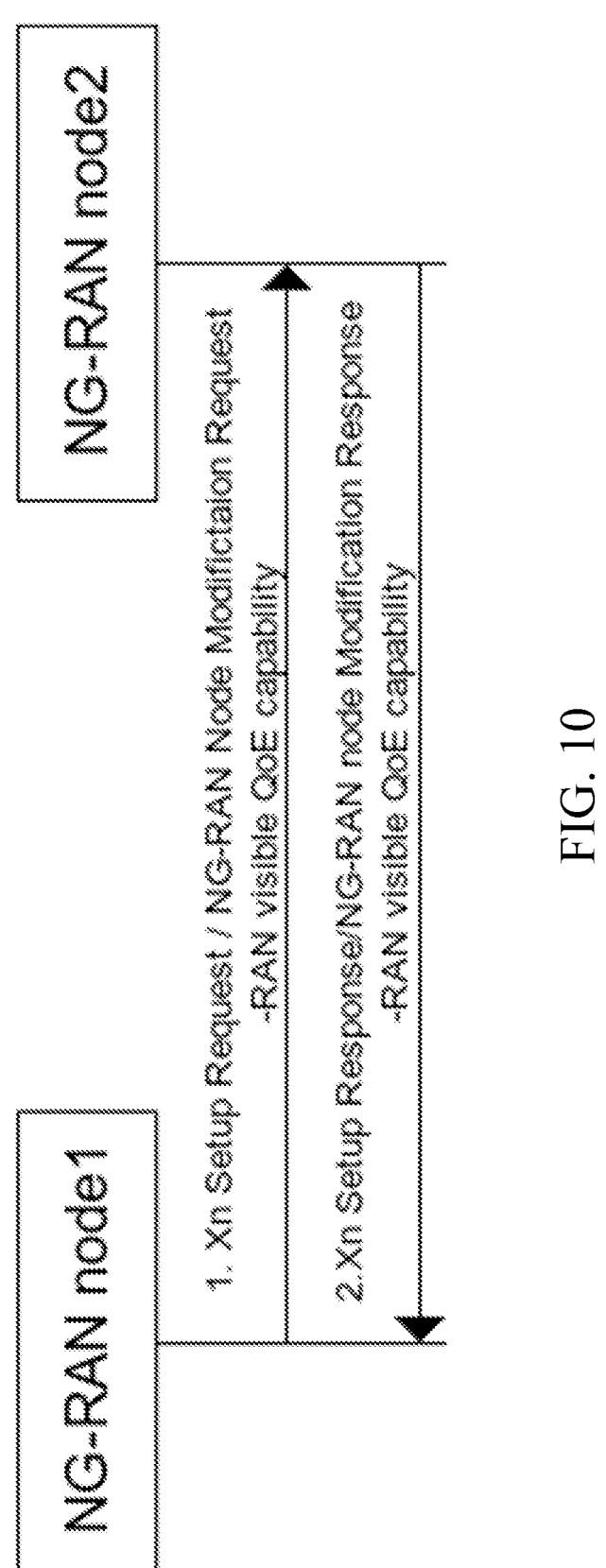
FIG. 10 shows an example timing diagram for RAN-visible QoE measurement capability information exchange for mobility scenarios.

FIG. 10 shows an example timing diagram for RAN-visible QoE measurement capability information exchange for mobility scenarios. In some mobility scenario embodiments, when the UE is handed over from the source NG-RAN node to the target NG-RAN node, the RAN-visible QoE capability of the target NG-RAN node should be known by the source node, in order to determine whether the target NG-RAN node can support RAN-visible QoE. In an example, an Xn Application Protocol (XnAP) messages is used for NG-RAN nodes to exchange their capability information for RAN-visible QoE.

In some embodiments, as shown in FIG. 10, the following steps are performed:

Step 1: The NG-RAN node1 sends an XnAP message (e.g., Xn Setup Request/NG-RAN Node Modification Request) to the NG-RAN node2, which includes the RAN-visible QoE capability information of NG-RAN node1, to indicate, to the NG-RAN node2, its capability to support RAN-visible QoE. The RAN-visible QoE capability information includes at least one of the following:

an indication that the NG-RAN node can support RAN-visible QoE;

a network ID of the supported network, e.g., a PLMN or an SNPN; or a supported service type.

Step 2: The NG-RAN node2 stores the RAN-visible QoE information of NG-RAN node1 and sends a response XnAP message to NG-RAN node1, which includes the RAN-visible QoE capability of NG-RAN node2, which indicates its capability to support RAN-visible QoE. The RAN-visible QoE capability information includes at least one of the following:

an indication that the NG-RAN node can support RAN-visible QoE;

a network ID of the supported network, e.g., a PLMN or an SNPN; or a supported service type.

12. Examples of RAN Checking Area Scope in Mobility Scenarios

Figure 11:
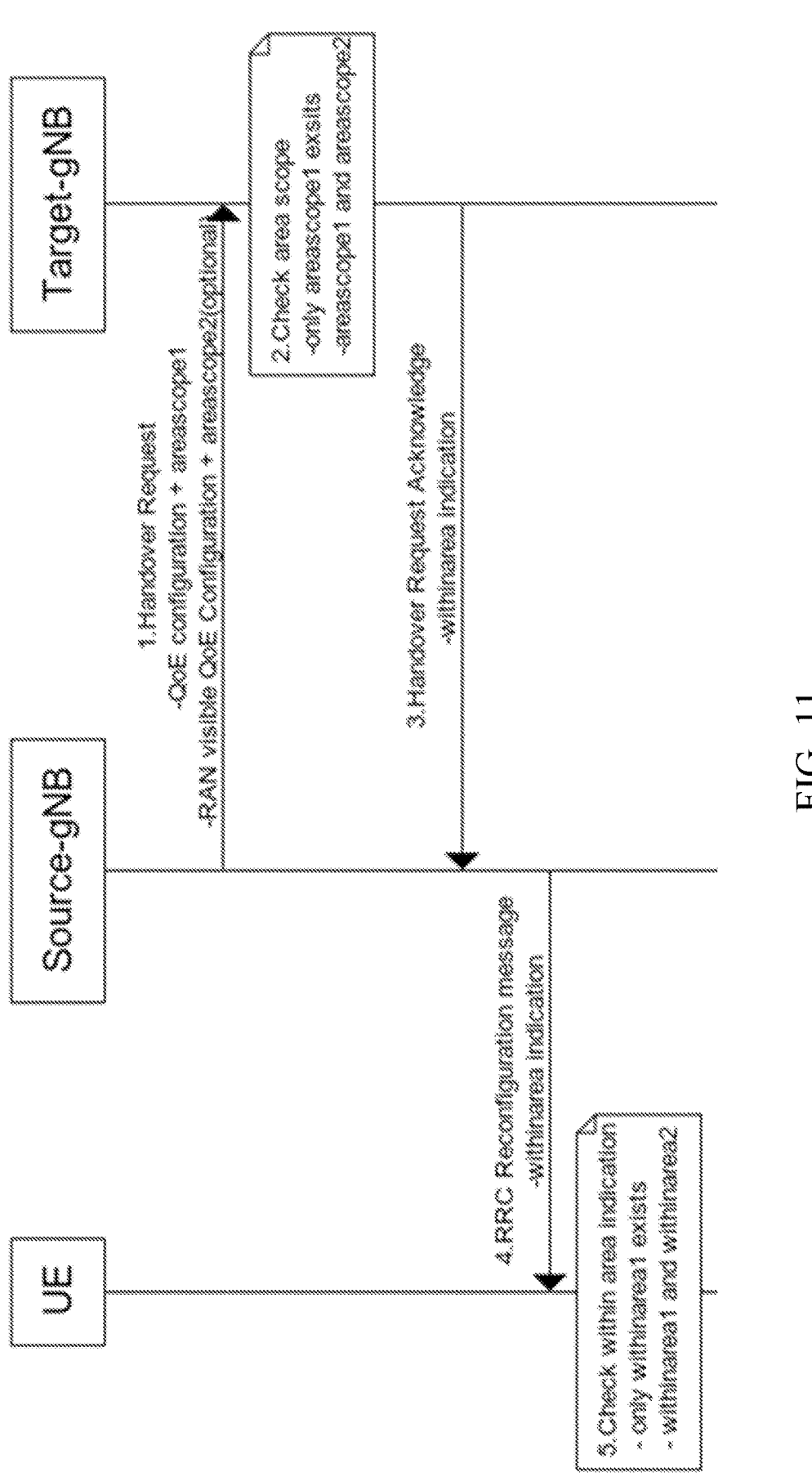
FIGS. 11 and 12 show example timing diagrams for the RAN and the User Equipment (UE) checking the area scope in the mobility scenarios, respectively.

FIG. 11 shows an example timing diagram for the RAN checking the area scope in mobility scenarios. In some embodiments, as shown in FIG. 11, the following steps are performed:

Step 1: The Source-gNB sends the Handover (HO) Request message to Target-gNB, which includes at least one of the following:

a legacy QoE configuration and a first area scope (denoted areascope1); and (optionally) a RAN-visible QoE configuration and a second area scope (denoted areascope2).

Step 2: The Target-gNB checks the received area scope for QoE measurements. If only areascope1 exists, then areascope1 is applied to the RAN-visible QoE, which results in the legacy QoE and RAN-visible QoE using the same area scope for mobility. If both areascope1 and areascope2 exist, the behavior of the Target-gNB is determined based on one of the following two options:

(1) only check areascope2 for RAN-visible QoE; if the UE is in areascope2, then apply the received RAN-visible QoE configuration for the UE; or (2) check areascope1 and areascope2; if the UE is in both scopes, then apply the received RAN-visible QoE configuration for the UE.

Step 3: The Target-gNB sends the response XnAP message (e.g. Handover Request Acknowledge) to the Source-gNB, with a "within area" indication based on the area scope received in Step 2. The within area indication includes the following:

withinarea1, indicating that the UE is in the scope of areascope1; and (optionally) withinarea2, indicating that the UE is in the scope of areascope2.

Step 4: The Source-gNB sends an RRC message (e.g. RRC Reconfiguration message) to the UE to transfer the withinarea indication to the UE.

Step 5: The UE checks the withinarea indication in the received RRC message. If only withinarea1 exists and the indication is true, then the UE sends the RAN-visible QoE report to the Target-gNB. However, if both withinarea1 and withinarea2 exist, the behavior of the UE is determined based on one of the following two options:

(1) only check withinarea2; if withinarea2 is true, the UE transmits the RAN-visible QoE report to the Target-gNB; or (2) check both withinarea1 and withinarea2; if both indications are true, then the UE transmits the RAN-visible QoE report to the Target-gNB.

13. Examples of UE Checking Area Scope in Mobility Scenarios

Figure 12:
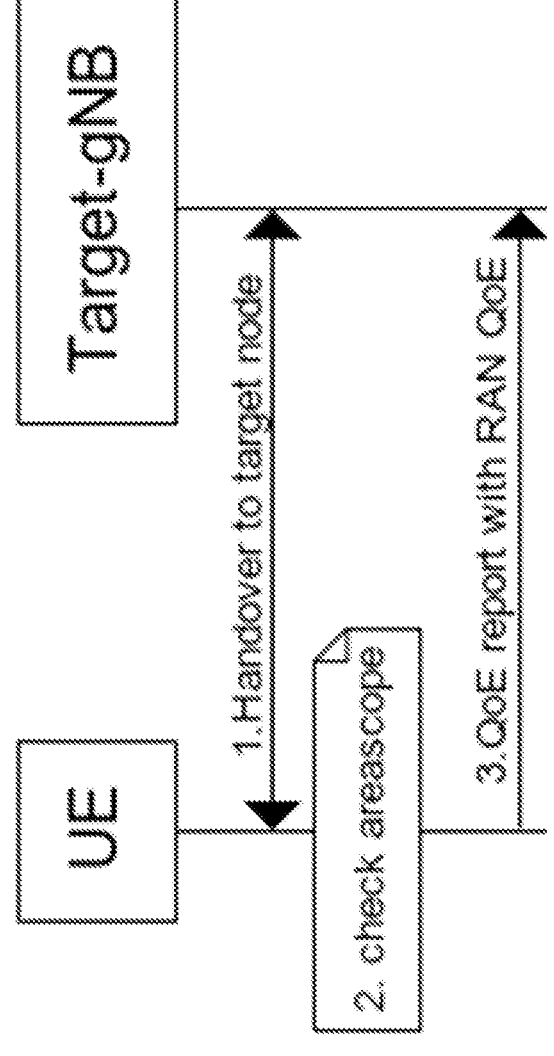

FIG. 12 shows an example timing diagram for the UE checking the area scope in mobility scenarios. In some embodiments, as shown in FIG. 12, the following steps are performed:

Step 1: The UE is handed over to the Target-gNB.

Step 2: The UE checks the area scope for the QoE measurement. If only areascope1 exists, and the UE is in area scope1, then the UE transmits the RAN-visible QoE report to the Target-gNB. If both areascope1 and areascope2 exist, the behavior of the UE is determined based on one of the following two options:

(1) only check areascope2 for RAN QoE; if the UE is in areascope2, then the UE transmits the RAN-visible QoE report to the Target-gNB; or (2) check areascope1 and areascope2; if the UE is in both scopes, then UE transmits the RAN-visible QoE report to the Target-gNB.

Step 3: UE sends the QoE report with the RAN-visible QoE report to the Target-gNB.

14. Examples of RAN Retrieving QoE Measurements from UE

Figure 13:
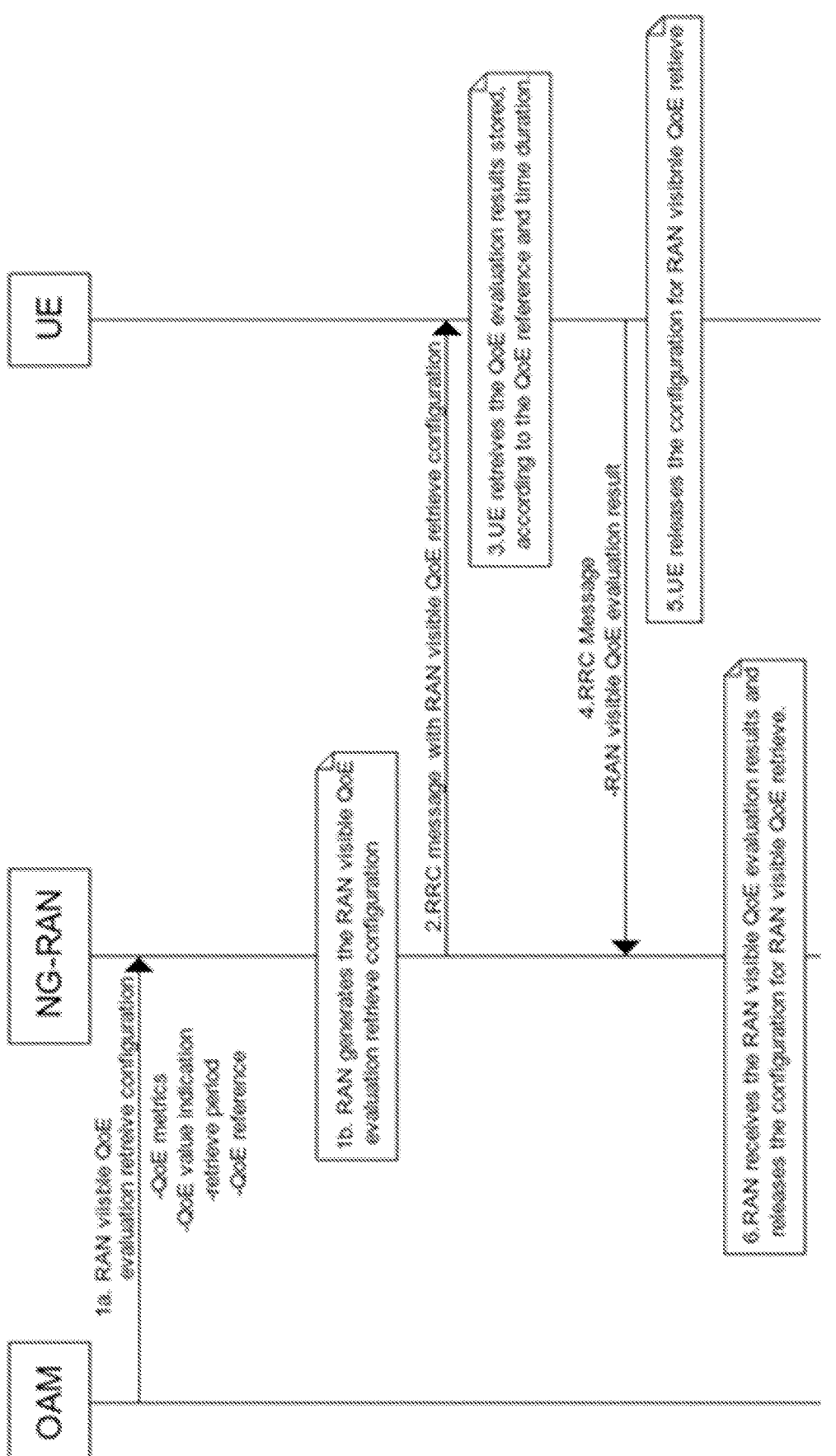
FIG. 13 shows an example timing diagram for the RAN retrieving QoE measurements collected by a UE (or wireless device, or mobile device).

FIG. 13 shows an example timing diagram for the RAN retrieving QoE measurements collected by a UE (or wireless device, or mobile device). In some embodiments, the RAN-visible QoE evaluation retrieval is used for the RAN node to acquire QoE evaluations based on measurement results or QoE reports that have been stored in the UE. That is, the measurements results and reports are based on measurements that have been collected prior to Step 1, described below, and not based on measurements that are made in a future time. Before the RAN node starts the RAN-visible QoE retrieval, it is assumed that at least one QoE measurement exists in the UE AS layer or in the UE application layer. Once the RAN-visible QoE retrieval has been completed, the RAN node releases the RAN-visible QoE retrieve configuration.

In some embodiments, as shown in FIG. 13, the following steps are performed:

Step 1a: The OAM decides to retrieve the RAN-visible QoE measurements and sends the RAN-visible QoE retrieval configuration to the NG-RAN node.

Step 1b: The RAN node decides to retrieve the RAN-visible QoE measurements and generates the configuration. In some embodiments, the RAN-visible QoE retrieval configuration includes at least one of the following:

QoE metrics, which are required to be measured by the UE and reported to the RAN node. These metrics are usually useful for optimizations performed by the RAN node, and include metrics like round-trip time, jitter duration, corruption duration, average throughput, rendered viewpoints, codec information, and so on;

QoE values indication, which indicates that the UE report the calculated numeric QoE values or qualitative representations (such as "Good", "Moderate" or "Bad"), and where the QoE values or qualitative representations should be calculated, i.e., by the UE, the RAN node, or the QoE Server;

a retrieval period, which includes a start time and an end time, and indicates that the UE only evaluate stored QoE measurement within the specified duration. For example, the measurement period can be specified to be five minutes before a RAN-visible QoE retrieval message is received; or a QoE reference, which indicates the specific QoE measurement session that the RAN wants the UE to evaluate.

Step 2: The NG-RAN node sends an RRC message to the UE, which includes the RAN-visible QoE retrieval configuration.

Step 3: The UE retrieves the stored QoE measurement results based on the QoE reference and time period, and then generates the RAN-visible QoE evaluation results.

Step 4: The UE sends an RRC message to the NG-RAN node, which includes the RAN-visible QoE evaluation result.

Step 5: The UE releases the configuration for RAN-visible QoE retrieval.

Step 6: The RAN node receives the RAN-visible QoE report and releases the configuration for the RAN-visible QoE retrieval.

15. Example Methods and Embodiments for the Disclosed Technology

Embodiments of the disclosed technology describe, among others, the following technical solutions for configuring quality-of-experience (QoE) measurements in mobile cellular networks to maintain service continuity:

(1) Activation and deactivation procedures for RAN-visible QoE measurement, including several Information Elements (IEs) in the activation/deactivation configuration.

(2) Activation and deactivation procedures for RAN-visible QoE measurements in the CU-DU split scenario, including several IEs in the activation/deactivation configuration.

(3) Suspension/resumption of RAN-visible QoE triggered by the RAN node, including an indication from the gNB-DU to the gNB-CU, in order to suspend the RAN-visible QoE measurement.

(4) The reporting of RAN-visible QoE measurement results, including the collection of RAN-visible QoE metrics and the calculation of RAN-visible QoE values.

(5) RAN-visible QoE measurements for mobility scenarios, including (i) RAN-visible QoE capability exchanges between NG-RAN nodes through NGAP, and (ii) methods to check area scope, which could be checked by the Target-gNB or the UE.

(6) RAN-visible QoE retrieval, to retrieve QoE measurement results stored in UE.

FIGS. 14-17 show example methods that can implement the technical solution described above in, for example, the embodiments shows in Sections 2-14.

FIG. 14 shows an example of a wireless communication method 1400. The method 1400 includes, at operation 1410, generating, by a network node based on a first QoE measurement configuration, a second QoE measurement configuration, the first QoE measurement configuration configuring the wireless device to perform QoE measurements that are not visible to the network node and the second QoE measurement configuration configuring the wireless device to perform QoE measurement that are visible to the network node.

The method 1400 includes, at operation 1420, transmitting, to a wireless device, a first radio resource control message comprising the second QoE measurement configuration and an activation configuration.

FIG. 15 shows an example of a wireless communication method 1500. The method 1500 includes, at operation 1510, making a determination, by a distributed unit (DU) of a network node, regarding activating a wireless device to perform quality of experience (QoE) measurements that are visible to the network node.

The method 1500 includes, at operation 1520, generating, based on the determination, a first QoE measurement configuration that configures the wireless device to perform QoE measurement that are visible to the network node.

The method 1500 includes, at operation 1530, transmitting, to a central unit (CU) of the network node, an F1 Application Protocol (F1AP) requirement message comprising the first QoE measurement configuration.

The method 1500 includes, at operation 1540, receiving, from the CU in response to the transmitting, an F1AP confirmation message comprising the first QoE measurement configuration and a second QoE measurement configuration that configures the wireless device to perform QoE measurement that are not visible to the network node.

Figure 16:
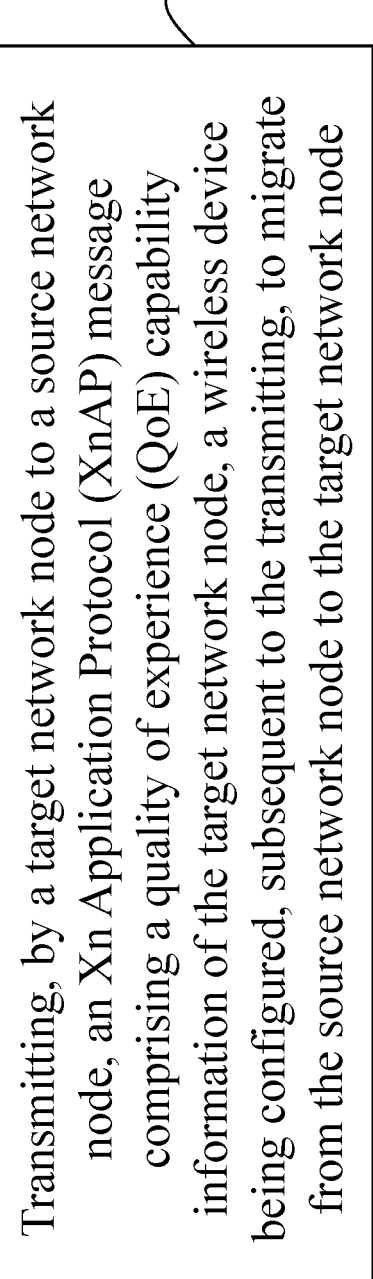

FIG. 16 shows an example of a wireless communication method 1600. The method 1600 includes, at operation 1610, transmitting, by a target network node to a source network node, an Xn Application Protocol (XnAP) message comprising a QoE capability information of the target network node, a wireless device being configured, subsequent to the transmitting, to migrate from the source network node to the target network node.

Figure 17:
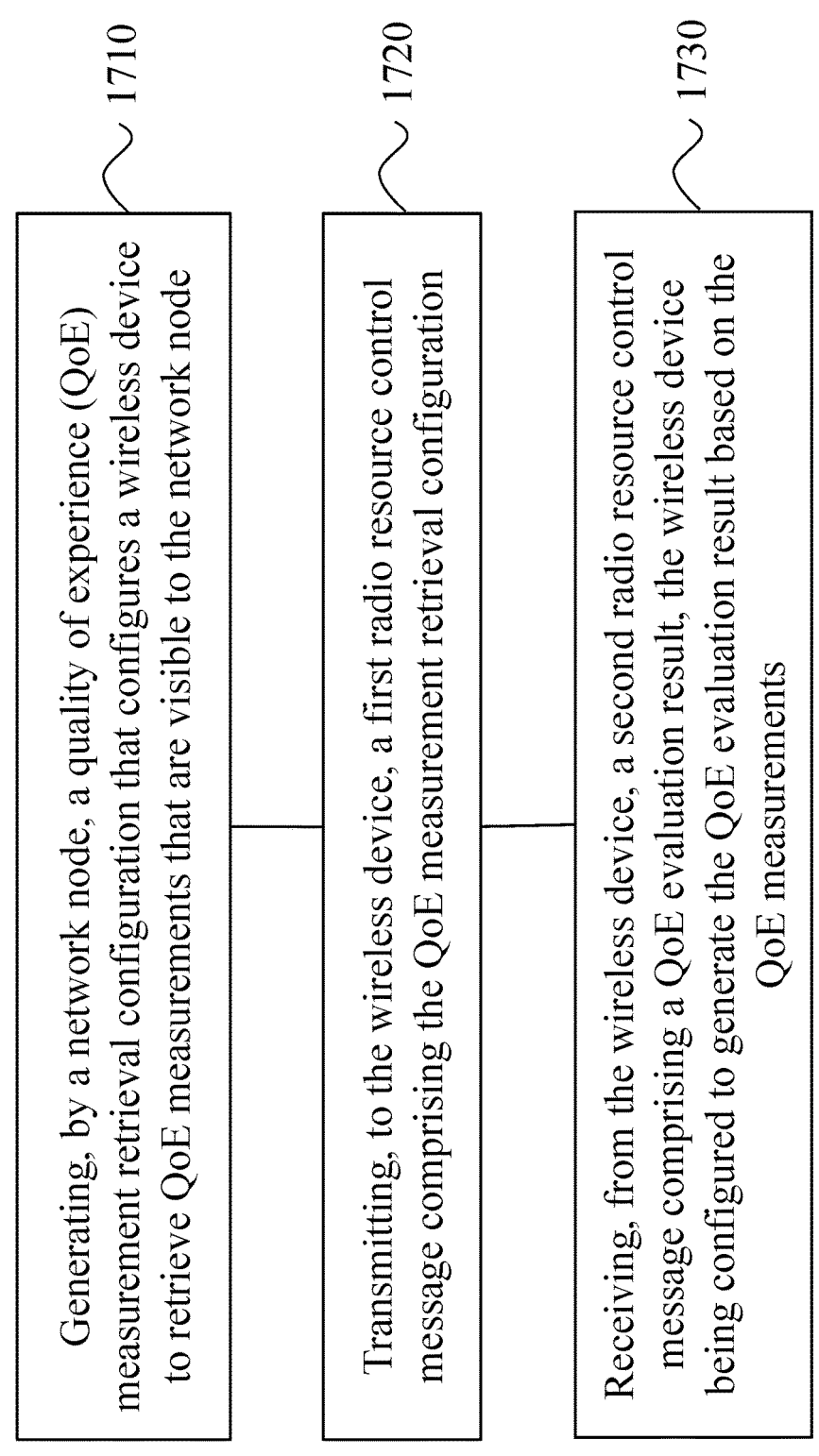

FIG. 17 shows an example of a wireless communication method 1700. The method 1700 includes, at operation 1710, generating, by a network node, a quality of experience (QoE) measurement retrieval configuration that configures a wireless device to retrieve QoE measurements that are visible to the network node.

The method 1700 includes, at operation 1720, transmitting, to the wireless device, a first radio resource control message comprising the QoE measurement retrieval configuration.

The method 1700 includes, at operation 1730, receiving, from the wireless device, a second radio resource control message comprising a QoE evaluation result, the wireless device being configured to generate the QoE evaluation result based on the QoE measurements.

A listing of solutions preferred by some embodiments is provided next.

1. A method of wireless communication, as described in Section 2, comprising generating, by a network node based on a first quality of experience (QoE) measurement configuration, a second QoE measurement configuration, and transmitting, to a wireless device, a first radio resource control message comprising the second QoE measurement configuration and an activation configuration, wherein the first QoE measurement configuration configures the wireless device to perform QoE measurements that are not visible to the network node and the second QoE measurement configuration configures the wireless device to perform QoE measurement that are visible to the network node.

2. The method of solution 1, as described in Section 3, wherein the network node comprises a central unit (CU) and a distributed unit (DU) that is separate from the CU, and wherein the first QoE measurement configuration is received by the CU.

3. The method of solution 2, as described in Section 4, further comprising transmitting, by the CU to the DU, an F1 Application Protocol (F1AP) request message comprising the first QoE measurement configuration and the second QoE measurement configuration, and receiving, from the DU, an F1AP response message comprising an indication that the DU has received the F1AP request message.

4. The method of solution 2, as described in Section 5, further comprising transmitting, by the CU to the DU, an F1 Application Protocol (F1AP) request message comprising the first QoE measurement configuration, and receiving, from the DU, an F1AP response message comprising the second QoE measurement configuration, wherein the DU is configured to generate the second QoE measurement configuration upon receiving the F1AP request message.

5. The method of solution 1, as described in Section 6, further comprising receiving, by the network node, a first deactivation message corresponding to the first QoE measurement configuration, and transmitting, subsequent to the receiving the first deactivation message, a second deactivation message corresponding to both the first QoE measurement configuration and the second QoE measurement configuration.

6. The method of solution 5, wherein the second deactivation message comprises at least one of a deactivation indication corresponding to both the first QoE measurement configuration and the second QoE measurement configuration, a QoE reference for the second QoE measurement configuration, or a service type for the second QoE measurement configuration.

7. The method of solution 1, as described in Section 6, further comprising transmitting, by the network node, a deactivation message corresponding to the second QoE measurement configuration.

8. The method of solution 7, wherein the deactivation message comprises a deactivation indication corresponding to the second QoE measurement configuration, a QoE reference for the second QoE measurement configuration, or a service type for the second QoE measurement configuration.

9. The method of solution 2, as described in Section 7, wherein the CU makes a determination to deactivate QoE measurements that are visible to the network node, and wherein the method further comprises transmitting, by the CU to the DU, an F1 Application Protocol (F1AP) request message comprising a deactivation message corresponding to both the first QoE measurement configuration and the second QoE measurement configuration, and receiving, from the DU, an F1AP response message comprising an indication that the DU has released configurations related to the both the first QoE measurement configuration and the second QoE measurement configuration.

10. The method of solution 9, wherein the deactivation message comprises at least one of a deactivation indication corresponding to both the first QoE measurement configuration and the second QoE measurement configuration, a QoE reference for the second QoE measurement configuration, or a service type for the second QoE measurement configuration.

11. The method of solution 2, as described in Section 8, wherein the DU makes a determination to deactivate QoE measurements that are visible to the network node, and wherein the method further comprises generating, by the DU, a deactivation configuration corresponding to the second QoE measurement configuration, and transmitting, to the CU, an F1AP message comprising the deactivation configuration.

12. The method of solution 11, wherein the deactivation configuration comprises a deactivation indication corresponding to the second QoE measurement configuration, a QoE reference for the second QoE measurement configuration, or a service type for the second QoE measurement configuration.

13. The method of any of solutions 5 to 12, further comprising transmitting, to the wireless device, a second radio resource control message comprising a deactivation configuration.

14. The method of solution 2, as described in Section 9, wherein the CU makes a determination to suspend or resume QoE measurements that are visible to the network node, and wherein the method further comprises transmitting, from the CU to the DU, an F1AP request message comprising a configuration to suspend or resume the QoE measurements that are visible to the network node, and receiving, from the DU and subsequent to transmitting the F1AP request message, an F1AP response message.

15. The method of solution 2, as described in Section 9, wherein the DU makes a determination to suspend or resume QoE measurements that are visible to the network node, and wherein the method further comprises transmitting, from the DU to the CU, an F1AP request message comprising a configuration to suspend or resume the QoE measurements that are visible to the network node.

16. The method of solution 14 or 15, wherein the configuration to suspend or resume the QoE measurements that are visible to the network node comprises at least one of an indication to suspend or resume the QoE measurements that are visible to the network node, a QoE reference for the second QoE measurement configuration, or a service type for the second QoE measurement configuration.

17. The method of solution 1, as described in Section 10, further comprising receiving, from the wireless device, a QoE report comprising one or more QoE values that are visible to the network node, wherein the wireless device is configured to calculate the one or more QoE values based on QoE metrics that are determined using QoE measurements obtained using the second QoE measurement configuration.

18. The method of solution 1, as described in Section 10, further comprising receiving, from the wireless device, a QoE report comprising QoE metrics that are based on QoE measurements obtained using the second QoE measurement configuration, and calculating one or more QoE values based on the QoE metrics.

19. The method of solution 1, as described in Section 10, further comprising receiving, from a QoE server, a QoE report comprising one or more QoE values that are visible to the network node, wherein the QoE server is configured to calculate the one or more QoE values based on QoE metrics that are determined based on QoE measurements obtained by the wireless device using the second QoE measurement configuration.

20. The method of any of solutions 17 to 19, wherein each of the one or more QoE values are associated with a corresponding qualitative representation.

21. A method of wireless communication, as described in Section 5, comprising making a determination, by a distributed unit (DU) of a network node, regarding activating a wireless device to perform quality of experience (QoE) measurements that are visible to the network node, generating, based on the determination, a first QoE measurement configuration that configures the wireless device to perform QoE measurement that are visible to the network node, transmitting, to a central unit (CU) of the network node, an F1 Application Protocol (F1AP) requirement message comprising the first QoE measurement configuration, and receiving, from the CU in response to the transmitting, an F1AP confirmation message comprising the first QoE measurement configuration and a second QoE measurement configuration that configures the wireless device to perform QoE measurement that are not visible to the network node.

22. The method of any of solutions 1 to 21, wherein the QoE measurement configuration corresponding to measurements that are visible to the network node comprises at least one of a radio access network (RAN) visible QoE reference identifier, a service type, a target network, a QoE collection RAN node, a slice ID, a slice scope, one or more RAN-visible QoE metrics, a RAN-visible QoE values indication, a QoE values location, a measurement duration, an area scope, an area scope indication, a report period, a report event trigger, or a reporting methodology.

23. The method of solution 22, wherein the one or more RAN-visible QoE metrics comprises at least one of an average round trip time of one or more packets, an application name, an application identifier, an average throughput, an initial playout delay, an average jitter duration, a device information, an average buffer level, a buffer occupancy of a playout, or an average frame rate of a video playback.

24. A method of wireless communication, as described in Section 11, comprising transmitting, by a target network node to a source network node, an Xn Application Protocol (XnAP) message comprising a quality of experience (QoE) capability information of the target network node, wherein a wireless device is configured, subsequent to the transmitting, to migrate from the source network node to the target network node.

25. The method of solution 24, wherein the QoE capability information comprises at least one of an indicate that a network node can support performing QoE measurements that are visible to a network node, a network identifier associated with the target network node, or a service type.

26. The method of solution 24 or 25, as described in Section 12, further comprising receiving, by the target network node from the source network node, a handover request message comprising a first quality of experience (QoE) measurement configuration that configures a wireless device to perform QoE measurements that are not visible to the source network node, a second QoE measurement configuration that configures the wireless device to perform QoE measurements that are visible to the source network node, and a first area scope for the QoE measurements.

27. The method of solution 26, further comprising performing a check of the first area scope that corresponds to a geographical area that supports QoE measurements that correspond to both the first QoE measurement configuration and the second QoE measurement configuration.

28. The method of solution 27, wherein the handover request further comprises a second area scope, and wherein the method further comprises performing a check of the second area scope that that corresponds to a geographical area that supports QoE measurements that correspond to the second QoE measurement configuration.

29. The method of solution 26, as described in Section 13, wherein the wireless device is configured, subsequent to migrating to the target network node, to performing a check of the first area scope that corresponds to a geographical area that supports QoE measurements that correspond to both the first QoE measurement configuration and the second QoE measurement configuration, and transmitting, to the target network node, a report based on the second QoE measurement configuration.

30. A method of wireless communication, as described in Section 14, comprising generating, by a network node, a quality of experience (QoE) measurement retrieval configuration that configures a wireless device to retrieve QoE measurements that are visible to the network node, transmitting, to the wireless device, a first radio resource control message comprising the QoE measurement retrieval configuration, and receiving, from the wireless device, a second radio resource control message comprising a QoE evaluation result, wherein the wireless device is configured to generate the QoE evaluation result based on the QoE measurements.

31. The method of solution 30, wherein the QoE measurement retrieval configuration comprises at least one of a QoE metric, a QoE value indication, a retrieval period, or a QoE reference.

32. A wireless communications apparatus comprising a processor and a memory, wherein the processor is configured to read code from the memory and implement a method recited in any of solutions 1 to 31.

33. A computer program product comprising a computer-readable program medium code stored thereupon, the code, when executed by a processor, causing the processor to implement a method recited in any of solutions 1 to 31.

FIG. 18 is a block diagram representation of a portion of an apparatus, in accordance with some embodiments of the presently disclosed technology. An apparatus 1805, such as a base station or a wireless device (or UE), can include processor electronics 1810 such as a microprocessor that implements one or more of the techniques presented in this document. The apparatus 1805 can include transceiver electronics 1815 to send and/or receive wireless signals over one or more communication interfaces such as antenna(s) 1820. The apparatus 1805 can include other communication interfaces for transmitting and receiving data. Apparatus 1805 can include one or more memories (not explicitly shown) configured to store information such as data and/or instructions. In some implementations, the processor electronics 1810 can include at least a portion of the transceiver electronics 1815. In some embodiments, at least some of the disclosed techniques, modules or functions are implemented using the apparatus 1805.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:
generating, by a network node based on a first quality of experience (QoE) measurement configuration, a second QoE measurement configuration, wherein the network node comprises a central unit (CU) and a distributed unit (DU) that is separate from the CU;
transmitting, to a wireless device, a first radio resource control message comprising the second QoE measurement configuration, wherein the first QoE measurement configuration configures the wireless device to perform a QoE measurement that is not visible to the network node and the second QoE measurement configuration configures the wireless device to perform a QoE measurement that is visible to the network node;

transmitting, by the CU to the DU, an F1 Application Protocol (F1AP) request message comprising the first QoE measurement configuration and the second QoE measurement configuration; and receiving, from the DU, an F1AP response message comprising an indication that the DU has received the F1AP request message.

2. The method of claim 1, further comprising:

transmitting, by the CU to the DU, an F1AP request message comprising the first QoE measurement configuration; and receiving, from the DU, an F1AP response message comprising the second QoE measurement configuration, wherein the DU is configured to generate the second QoE measurement configuration upon receiving the F1AP request message.

3. The method of claim 1, wherein the CU makes a determination to deactivate QoE measurements that are visible to the network node, and wherein the method further comprises:

transmitting, by the CU to the DU, an F1 Application Protocol (F1AP) request message comprising a deactivation message corresponding to both the first QoE measurement configuration and the second QoE measurement configuration; and receiving, from the DU, an FAP response message comprising an indication that the DU has released configurations related to both the first QoE measurement configuration and the second QoE measurement configuration.

4. The method of claim 3, wherein the deactivation message comprises at least one of a deactivation indication corresponding to both the first QoE measurement configuration and the second QoE measurement configuration, a QoE reference for the second QoE measurement configuration, or a service type for the second QoE measurement configuration.

5. The method of claim 1, wherein the DU makes a determination to deactivate QoE measurements that are visible to the network node, and wherein the method further comprises:

receiving, at the CU from the DU, an F1AP message comprising a deactivation configuration, wherein the deactivation configuration corresponds to the second QoE measurement configuration.

6. The method of claim 5, wherein the deactivation configuration comprises a deactivation indication corresponding to the second QoE measurement configuration, a QoE reference for the second QoE measurement configuration, or a service type for the second QoE measurement configuration.

7. The method of claim 1, wherein the CU makes a determination to suspend or resume QoE measurements that are visible to the network node, and wherein the method further comprises:

transmitting, from the CU to the DU, an F1AP request message comprising a configuration to suspend or resume the QoE measurements that are visible to the network node, wherein the configuration to suspend or resume the QoE measurements that are visible to the network node comprises at least one of an indication to suspend or resume the QoE measurements that are visible to the network node, a QoE reference for the second QoE measurement configuration, or a service type for the second QoE measurement configuration; and receiving, from the DU and subsequent to transmitting the F1AP request message, an F1AP response message.

8. The method of claim 1, wherein the DU makes a determination to suspend or resume QoE measurements that are visible to the network node, and wherein the method further comprises:

receiving, at the CU from the DU, an F1AP request message comprising a configuration to suspend or resume the QoE measurements that are visible to the network node, wherein the configuration to suspend or resume the QoE measurements that are visible to the network node comprises at least one of an indication to suspend or resume the QoE measurements that are visible to the network node, a QoE reference for the second QoE measurement configuration, or a service type for the second QoE measurement configuration.

9. An apparatus for wireless communication, wherein the apparatus comprises a central unit (CU), a distributed unit (DU), processor electronics, and a memory storing instructions, wherein the DU is separate from the CU, and wherein execution of the instructions by the processor electronics causes the apparatus to:

receive a first quality of experience (QoE) measurement configuration;

generate, based on the first QoE measurement configuration, a second QoE measurement configuration;

transmit, to a wireless device, a first radio resource control message comprising the second QoE measurement configuration and an activation configuration, wherein the first QoE measurement configuration configures the wireless device to perform a QoE measurement that is not visible to the apparatus and the second QoE measurement configuration configures the wireless device to perform a QoE measurement that is visible to the apparatus;

transmit, from the CU to the DU, an F1 Application Protocol (F1AP) request message comprising the first QoE measurement configuration and the second QoE measurement configuration; and receive, from the DU, an F1AP response message comprising an indication that the DU has received the F1AP request message.

10. The apparatus of claim 9, wherein the apparatus is further caused to:

transmit, from the CU to the DU, an F1 Application Protocol (F1AP) request message comprising the first QoE measurement configuration; and receive, from the DU, an F1AP response message comprising the second QoE measurement configuration, wherein the DU is configured to generate the second QoE measurement configuration upon receiving the F1AP request message.

11. The apparatus of claim 9, wherein the CU makes a determination to deactivate QoE measurements that are visible to the apparatus, and wherein the apparatus is further caused to:

transmit, from the CU to the DU, an F1 Application Protocol (F1AP) request message comprising a deactivation message corresponding to both the first QoE measurement configuration and the second QoE measurement configuration; and receive, from the DU, an F1AP response message comprising an indication that the DU has released configurations related to both the first QoE measurement configuration and the second QoE measurement configuration.

12. The apparatus of claim 9, wherein the DU makes a determination to deactivate QoE measurements that are visible to the apparatus, and wherein the apparatus is further caused to:

receive, at the CU from the DU, an F1AP message comprising a deactivation configuration, wherein the deactivation configuration corresponds to the second QoE measurement configuration.

* * * * *